(12) United States Patent
Shimizu et al.

(10) Patent No.: US 12,244,255 B2
(45) Date of Patent: Mar. 4, 2025

(54) ELECTRIC MOTOR DRIVE DEVICE AND REFRIGERATION CYCLE APPLICATION DEVICE

(71) Applicant: Mitsubishi Electric Corporation, Tokyo (JP)

(72) Inventors: Koyo Shimizu, Tokyo (JP); Shinya Toyodome, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 52 days.

(21) Appl. No.: 18/253,976

(22) PCT Filed: Feb. 25, 2021

(86) PCT No.: PCT/JP2021/007170
§ 371 (c)(1),
(2) Date: May 23, 2023

(87) PCT Pub. No.: WO2022/180746
PCT Pub. Date: Sep. 1, 2022

(65) Prior Publication Data
US 2023/0412107 A1 Dec. 21, 2023

(51) Int. Cl.
*H02P 27/08* (2006.01)
(52) U.S. Cl.
CPC .................... *H02P 27/08* (2013.01)
(58) Field of Classification Search
CPC .. H02P 21/00; H02P 21/0003; H02P 21/0021; H02P 21/02; H02P 21/04;
(Continued)

(56) References Cited

U.S. PATENT DOCUMENTS

2016/0318404 A1* 11/2016 Kumazawa ........... H02M 3/158
2021/0257948 A1 8/2021 Toyodome et al.

FOREIGN PATENT DOCUMENTS

WO 2020/021681 A1 1/2020
WO 2020066028 A1 4/2020

OTHER PUBLICATIONS

Office Action mailed Jun. 11, 2024 for the corresponding Australian Patent application No. 2021429850.
(Continued)

*Primary Examiner* — Antony M Paul
(74) *Attorney, Agent, or Firm* — Posz Law Group, PLC

(57) ABSTRACT

An electric motor drive device includes a booster circuit, an inverter, a connection switching device, and first and second control devices. The booster circuit boosts a voltage value of a bus voltage to be applied to a DC bus. The bus voltage is applied to the inverter, and the inverter applies an AC voltage having a variable frequency and a variable voltage value to an electric motor. The connection switching device switches a connection state of windings of the electric motor. The second control device performs zero current control to control the inverter such that a current flowing through the electric motor or the connection switching device is zero. When operating the connection switching device to switch the connection state, the second control device performs the zero current control after a boosting operation of the booster circuit is stopped by the first control device.

7 Claims, 13 Drawing Sheets

(58) Field of Classification Search
CPC .......... H02P 21/22; H02P 23/00; H02P 21/14; H02P 23/28; H02P 25/00; H02P 25/062; H02P 25/064; H02P 25/184; H02P 25/18; H02P 25/188; H02P 27/16; H02P 27/08; H02P 2201/09; H02P 27/085; H02P 29/10; H02K 21/22; H02M 7/00; H02M 7/162; H02M 7/1623; H02M 1/08
See application file for complete search history.

(56) References Cited

OTHER PUBLICATIONS

Office Action mailed Oct. 8, 2024 for the corresponding European Patent Application No. 21927848.8.
Extended European Search Report mailed Mar. 6, 2024 for the corresponding European Patent Application No. 21927848.8.
International Search Report of the International Searching Authority mailed Apr. 20, 2021, issued in corresponding International Application No. PCT/JP2021/007170 (and English Machine Translation).
Office Action mailed Sep. 20, 2024 for the corresponding Australian Patent Application No. 2021429850.

\* cited by examiner (a)  (b)

ELECTRIC MOTOR DRIVE DEVICE AND REFRIGERATION CYCLE APPLICATION DEVICE

CROSS REFERENCE TO RELATED APPLICATION

This application is a U.S. national stage application of PCT/JP2021/007170 filed on Feb. 25, 2021, the contents of which are incorporated herein by reference.

FIELD

The present disclosure relates to an electric motor drive device that drives an electric motor configured to enable switching of a connection state of stator windings (hereinafter, simply referred to as "windings"), and a refrigeration cycle application device including the electric motor drive device.

BACKGROUND

Patent Literature 1 below discloses a technique for mutually switching a connection state of windings between star connection and delta connection during rotation of an electric motor, in an electric motor drive device that drives the electric motor configured to enable switching of a connection state of windings.

CITATION LIST

Patent Literature

Patent Literature 1: International Publication No. 2020/021681

SUMMARY OF INVENTION

Problem to be Solved by the Invention

In the technique described in Patent Literature 1, from the viewpoint of reliability of a relay for switching the connection state of the windings, connection switching of switching the connection state of the windings is performed in a state where a current flowing through the electric motor is set to zero. On the other hand, when the connection switching is performed while a converter is boosted, current does not flow to the electric motor side during connection switching control, so that a load on an inverter side decreases and a bus voltage rapidly increases. The rapid increase in bus voltage gives stress to a switching element. When an increase rate of the bus voltage is high, the switching element may be damaged. When the rapid increase in bus voltage is repeated and the stress on the switching element is accumulated, reliability of the device is reduced. Therefore, it is necessary to take a measure to prevent an increase in bus voltage due to connection switching of the windings.

The present disclosure has been made in view of the above, and an object thereof is to provide an electric motor drive device capable of preventing an increase in bus voltage that may occur due to connection switching of windings.

Means to Solve the Problem

In order to solve the above-described problems and achieve the object, an electric motor drive device according to the present disclosure includes a booster circuit, an inverter, a connection switching device, and a control device. The booster circuit boosts a voltage value of a bus voltage to be applied to a DC bus. The bus voltage is applied to the inverter, and the inverter applies an AC voltage having a variable frequency and a variable voltage value to an electric motor. The connection switching device switches a connection state of windings of the electric motor. The control device controls operations of the booster circuit, the inverter, and the connection switching device, and performs zero current control to control the inverter such that a current flowing through the electric motor or the connection switching device is zero. When operating the connection switching device to switch the connection state, the control device performs the zero current control after stopping a boosting operation of the booster circuit.

Effects of the Invention

According to the electric motor drive device of the present disclosure, an effect of being able to prevent an increase in bus voltage that may occur due to connection switching of windings is exhibited.

DESCRIPTION OF EMBODIMENTS

Hereinafter, an electric motor drive device according to embodiments of the present disclosure and a refrigeration cycle application device including the electric motor drive device will be described with reference to the accompanying drawings.

First Embodiment

Figure 1:
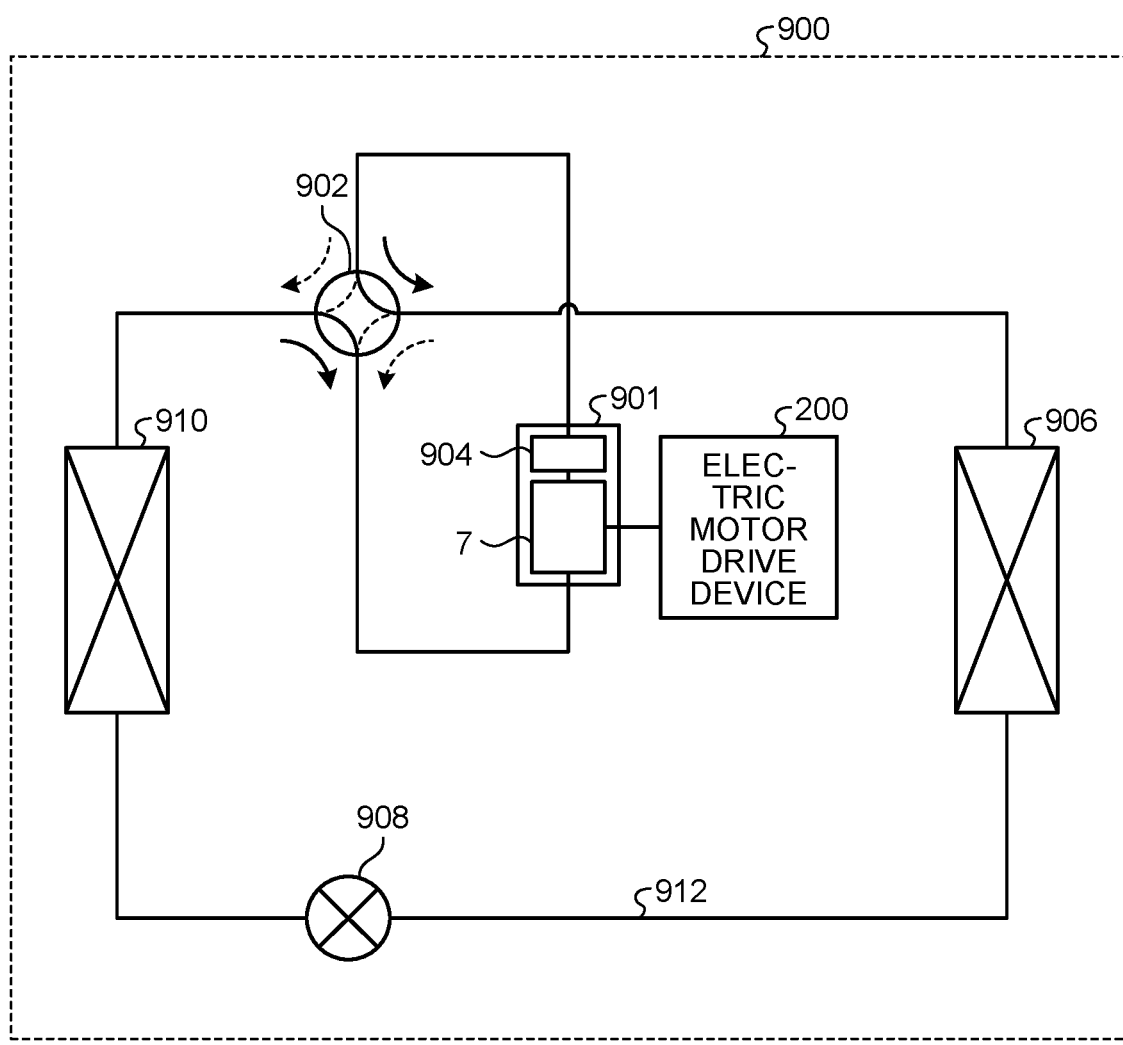
FIG. 1 is a diagram illustrating an exemplary configuration of a refrigeration cycle application device according to a first embodiment.

FIG. 1 is a diagram illustrating an exemplary configuration of a refrigeration cycle application device 900 according to a first embodiment. The refrigeration cycle application device 900 illustrated in FIG. 1 is an example of application of electric motor drive devices according to the first embodiment and second and third embodiments described later. The refrigeration cycle application device 900 includes an electric motor drive device 200. Note that, although FIG. 1 illustrates an air conditioner of a separate type, the air conditioner is not limited to the separate type. Further, the refrigeration cycle application device 900 according to the first embodiment can be applied to a product including a refrigeration cycle, such as an air conditioner, a refrigerator, a freezer, or a heat pump water heater.

In the refrigeration cycle application device 900 illustrated in FIG. 1, a compressor 901, a four-way valve 902, an indoor heat exchanger 906, an expansion valve 908, and an outdoor heat exchanger 910 are connected to each other via a refrigerant pipe 912.

Inside the compressor 901, a compression mechanism 904 that compresses a refrigerant, and an electric motor 7 that operates the compression mechanism 904 are provided. The electric motor drive device 200 is used to drive the electric motor 7 that is used for the compressor 901.

The refrigeration cycle application device 900 can perform heating operation or cooling operation through switching operation of the four-way valve 902. The compression mechanism 904 is driven by the electric motor 7 subjected to variable-speed control.

During the heating operation, as indicated by solid arrows, the refrigerant is pressurized and fed by the compression mechanism 904, and returns to the compression mechanism 904 through the four-way valve 902, the indoor heat exchanger 906, the expansion valve 908, the outdoor heat exchanger 910, and the four-way valve 902.

During the cooling operation, as indicated by broken arrows, the refrigerant is pressurized and fed by the compression mechanism 904, and returns to the compression mechanism 904 through the four-way valve 902, the outdoor heat exchanger 910, the expansion valve 908, the indoor heat exchanger 906, and the four-way valve 902.

During the heating operation, the indoor heat exchanger 906 acts as a condenser to release heat, and the outdoor heat exchanger 910 acts as an evaporator to absorb heat. During the cooling operation, the outdoor heat exchanger 910 acts as a condenser to release heat, and the indoor heat exchanger 906 acts as an evaporator to absorb heat. The expansion valve 908 decompresses and expands the refrigerant.

Figure 2:
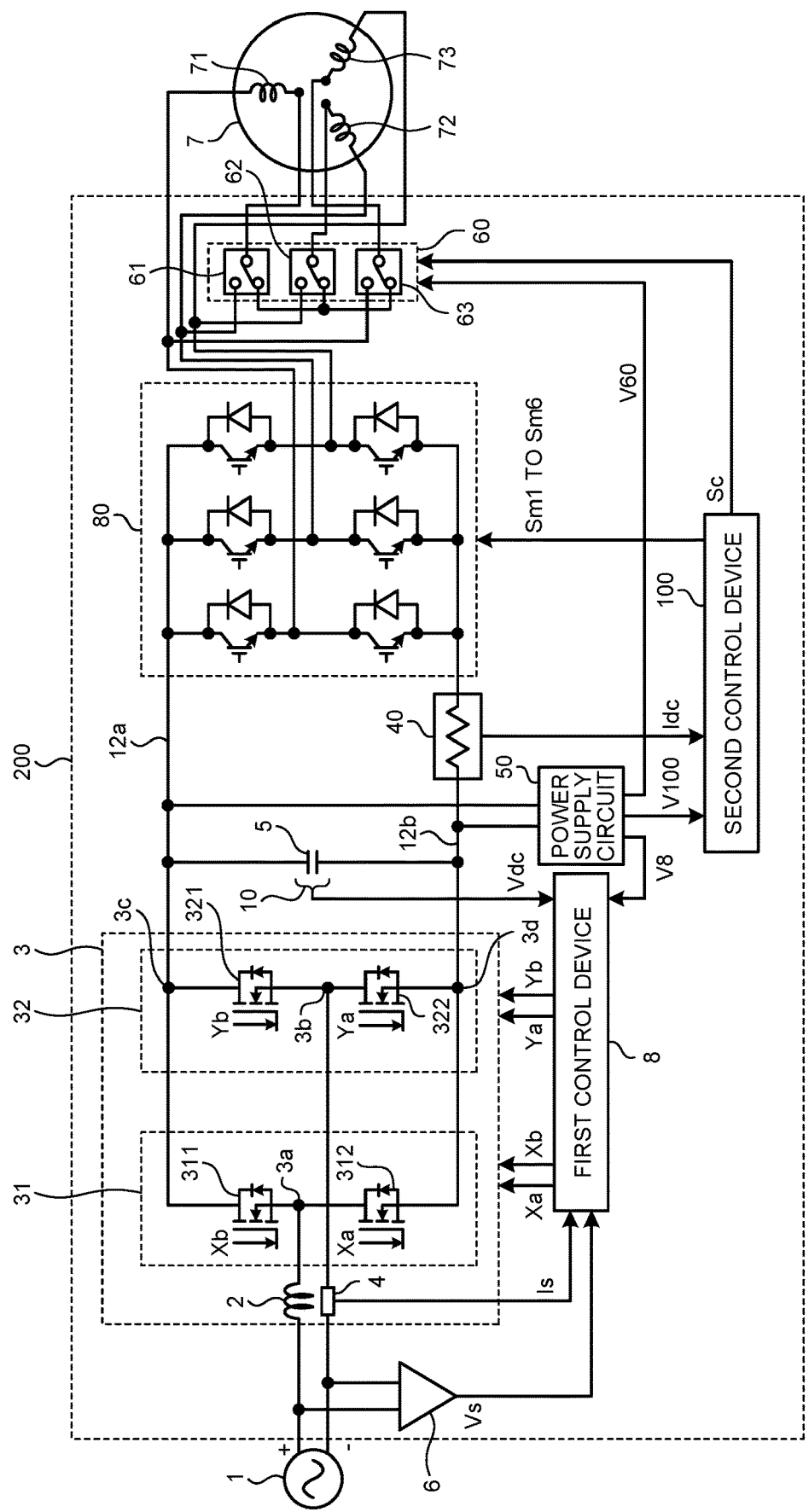
FIG. 2 is a schematic wiring diagram illustrating an electric motor drive device according to the first embodiment, together with an electric motor.

FIG. 2 is a schematic wiring diagram illustrating the electric motor drive device 200 according to the first embodiment, together with the electric motor 7. The electric motor drive device 200 includes a booster circuit 3, a smoothing capacitor 5, a first voltage detector 6, a power-supply current detector 4, a second voltage detector 10, a first control device 8, a second control device 100, an inverter 80, a connection switching device 60, a power supply circuit 50 as a control power supply, and a bus current detection unit 40.

The booster circuit 3 includes a reactor 2, a first leg 31, and a second leg 32. The first leg 31 and the second leg 32 are connected in parallel to each other. In the first leg 31, a first upper-arm switching element 311 and a first lower-arm switching element 312 are connected in series. In the second leg 32, a second upper-arm switching element 321 and a second lower-arm switching element 322 are connected in series. One end of the reactor 2 is connected to an alternating-current (AC) power supply 1. Another end of the reactor 2 is connected to a connection point 3a between the first upper-arm switching element 311 and the first lower-arm switching element 312 in the first leg 31. A connection point 3b between the second upper-arm switching element 321 and the second lower-arm switching element 322 is connected to another end of the AC power supply 1. In the booster circuit 3, the connection points 3a and 3b constitute an AC terminal. While converting an AC voltage output from the AC power supply 1 into a DC voltage, the booster circuit 3 boosts the DC voltage if necessary. Hereinafter, the voltage output from the AC power supply 1 is referred to as a "power supply voltage". Note that the power supply voltage may be referred to as a "first voltage".

Note that, FIG. 2 illustrates an example where the first and second upper-arm switching elements 311 and 321 and the first and second lower-arm switching elements 312 and 322 are metal oxide semiconductor field effect transistors (MOSFETs), but the switching elements are not limited to the MOSFETs. Instead of the MOSFETs, insulated gate bipolar transistors (IGBTs) may be used.

The first upper-arm switching element 311 includes a transistor and a diode connected in antiparallel to the transistor. Antiparallel means that a cathode of the diode is connected to a drain or a collector of the transistor, and an anode of the diode is connected to a source or an emitter of the transistor. When the first upper-arm switching element 311 is a MOSFET, a parasitic diode included in the MOSFET itself may be used as the diode. The parasitic diode is also referred to as a body diode. The other switching elements are similarly configured, and redundant description is omitted.

One end of the smoothing capacitor 5 is connected to a DC bus 12a on a high potential side. The DC bus 12a is drawn from a connection point 3c between the first upper-arm switching element 311 in the first leg 31 and the second upper-arm switching element 321 in the second leg 32. Another end of the smoothing capacitor 5 is connected to a DC bus 12b on a low potential side. The DC bus 12b is drawn from a connection point 3d between the first lower-arm switching element 312 in the first leg 31 and the second lower-arm switching element 322 in the second leg 32. In the booster circuit 3, the connection points 3c and 3d constitute a DC terminal.

As described above, the smoothing capacitor 5 is connected to the DC buses 12a and 12b. A boosted voltage output from the booster circuit 3 is applied across the smoothing capacitor 5. The smoothing capacitor 5 smooths the output voltage of the booster circuit 3. A bus voltage Vdc described above is a voltage smoothed by the smoothing capacitor 5. That is, the booster circuit 3 boosts a voltage value of the bus voltage Vdc to be applied to the DC buses 12a and 12b.

The first voltage detector 6 is connected across the AC power supply 1. The first voltage detector 6 detects a power supply voltage Vs. The power supply voltage Vs is an absolute value of an instantaneous voltage of the AC power supply 1. A detected value of the power supply voltage Vs is input to the first control device 8.

The power-supply current detector 4 is disposed between the AC power supply 1 and the booster circuit 3. The power-supply current detector 4 detects a power supply current Is flowing between the AC power supply 1 and the booster circuit 3. A detected value of the power supply current Is is input to the first control device 8.

The second voltage detector 10 is connected across the smoothing capacitor 5. The second voltage detector 10 detects the bus voltage Vdc. A detected value of the bus voltage Vdc is input to the first control device 8.

The bus current detection unit 40 detects a bus current, that is, a direct current (DC) Idc flowing to an input side of the inverter 80. The bus current detection unit 40 includes a shunt resistor inserted into the DC bus 12b. A detected value of the bus current detection unit 40 is input to the second control device 100.

The first control device 8 controls an operation of the booster circuit 3. Specifically, the first control device 8 generates drive pulses for driving individual switching elements of the booster circuit 3, on the basis of detected values of the first voltage detector 6, the power-supply current detector 4, and the second voltage detector 10. Note that, when the drive pulses for driving individual switching elements of the booster circuit 3 are distinguished, a drive pulse for driving the first lower-arm switching element 312 may be referred to as a "first drive pulse", while a drive pulse for driving the first upper-arm switching element 311 may be referred to as a "second drive pulse". Furthermore, the drive pulses for driving the second upper-arm switching element 321 and the second lower-arm switching element 322 may be collectively referred to as "synchronous drive pulses". The first drive pulse corresponds to Xa in the illustration, the second drive pulse corresponds to Xb in the illustration, and the synchronous drive pulses correspond to Ya and Yb in the illustration.

The second control device 100 controls operations of the inverter 80 and the connection switching device 60. In order to control the inverter 80, the second control device 100 generates pulse width modulation (PWM) signals Sm1 to Sm6, and outputs the PWM signals Sm1 to Sm6 to the inverter 80. In addition, in order to control the connection switching device 60, the second control device 100 generates a connection selection signal Sc, and outputs the connection selection signal Sc to the connection switching device 60.

The first control device 8 and the second control device 100 are implemented by a microprocessor. The microprocessor may be a processor or a processing device referred to as a central processing unit (CPU), a microcomputer, a digital signal processor (DSP), or the like. Further, there is no problem even if the first control device 8 and the second control device 100 are configured as one control device.

The electric motor 7 is an electric motor configured to enable switching a connection state of windings 71, 72, and 73. An example of the electric motor 7 is a three-phase permanent magnet electric motor. Further, the connection switching device 60 includes switching units 61, 62, and 63. In the electric motor 7, end portions of the windings 71, 72, and 73 are drawn outside, and switching can be performed to either star connection (written as "Y connection" where appropriate) or delta connection (written as "Δ connection" where appropriate). This switching is performed by the switching units 61, 62, and 63 of the connection switching device 60. That is, the connection switching device 60 performs an operation of mutually switching the connection state of the windings 71, 72, and 73 of the electric motor 7 between the Y connection and the Δ connection.

The power supply circuit 50 receives the bus voltage Vdc. The power supply circuit 50 steps down the received bus voltage Vdc to generate a control power supply voltage V8, a control power supply voltage V100, and a switching power supply voltage V60. The control power supply voltage V8 is applied to the first control device 8. The control power supply voltage V100 is applied to the second control device 100. The switching power supply voltage V60 is applied to the connection switching device 60.

Next, a basic circuit operation of the electric motor drive device 200 according to the first embodiment will be described with reference to the drawings of FIGS. 3 to 6.

Figure 3:
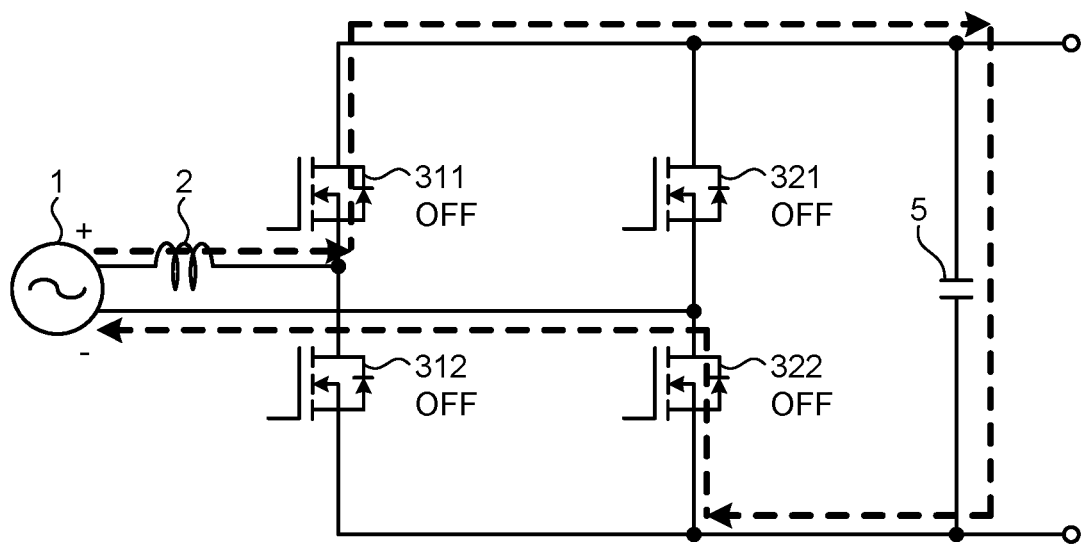
FIG. 3 is a diagram illustrating a charging path for a smoothing capacitor when a power supply voltage has a positive polarity, in a booster circuit of FIG. 2.
Figure 4:
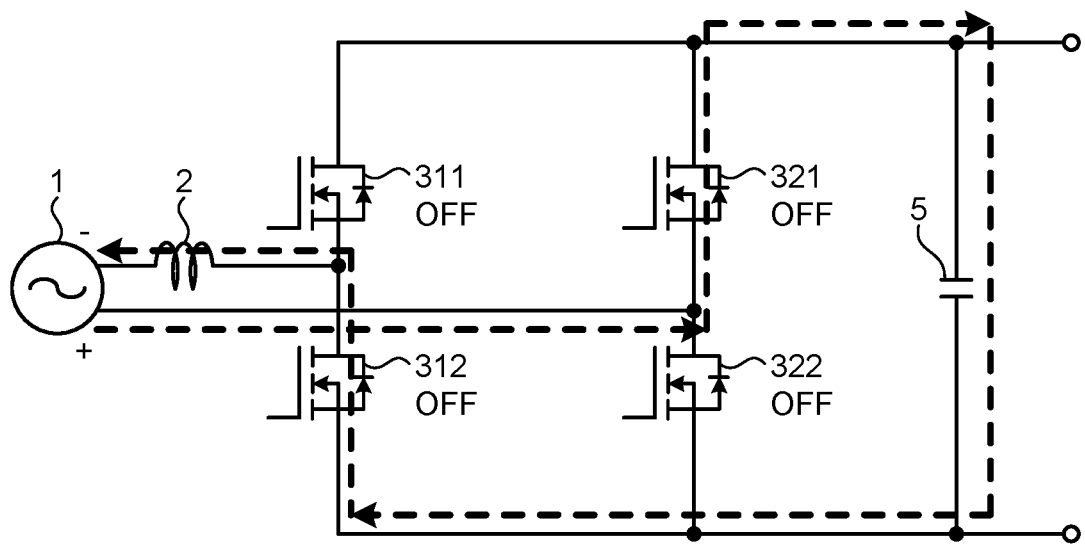
FIG. 4 is a diagram illustrating a charging path for the smoothing capacitor when a power supply voltage has a negative polarity, in the booster circuit of FIG. 2.
Figure 5:
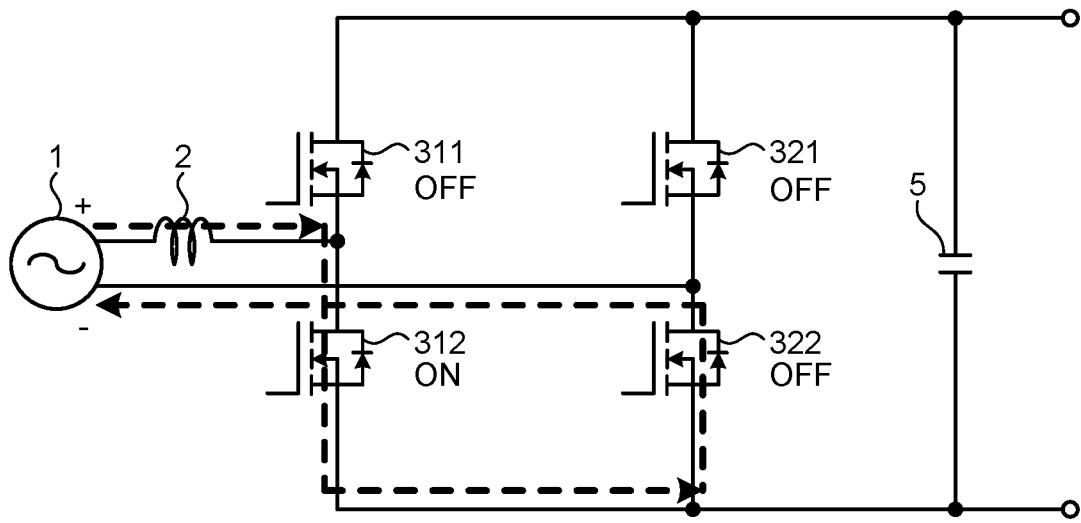
FIG. 5 is a diagram illustrating a short-circuit path of a power supply voltage through a reactor when the power supply voltage has a positive polarity, in the booster circuit of FIG. 2.
Figure 6:
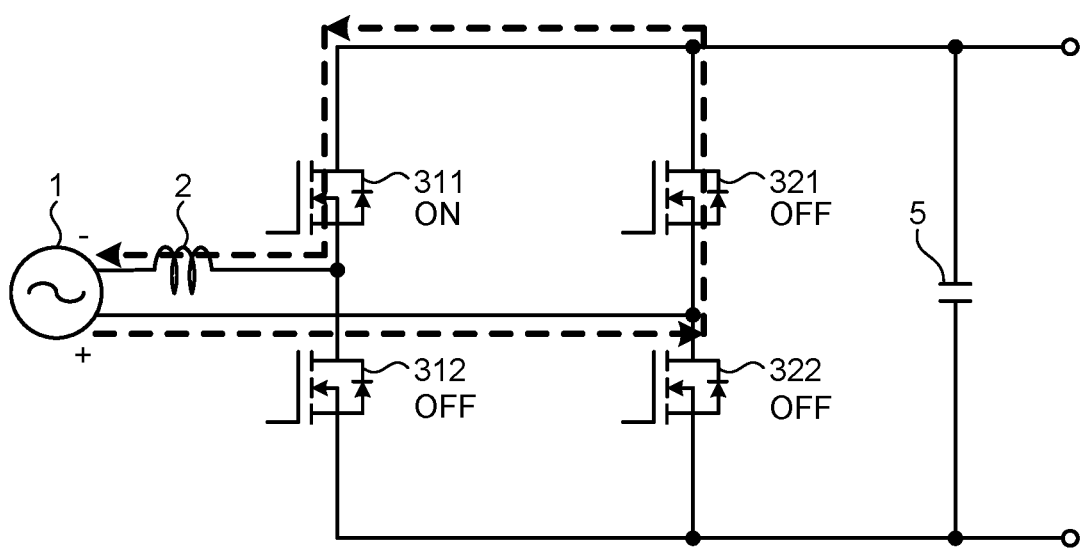
FIG. 6 is a diagram illustrating a short-circuit path of a power supply voltage through the reactor when the power supply voltage has a negative polarity, in the booster circuit of FIG. 2.

FIG. 3 is a diagram illustrating a charging path for the smoothing capacitor 5 when the power supply voltage Vs has a positive polarity, in the booster circuit 3 of FIG. 2. FIG. 4 is a diagram illustrating a charging path for the smoothing capacitor 5 when the power supply voltage Vs has a negative polarity, in the booster circuit 3 of FIG. 2. FIG. 5 is a diagram illustrating a short-circuit path of the power supply voltage Vs through the reactor 2 when the power supply voltage Vs has a positive polarity, in the booster circuit 3 of FIG. 2. FIG. 6 is a diagram illustrating a short-circuit path of the power supply voltage Vs through the reactor 2 when the power supply voltage Vs has a negative polarity, in the booster circuit 3 of FIG. 2. Note that, the polarity of the power supply voltage Vs is defined as positive when a terminal on an upper side of the AC power supply 1 has a positive potential as illustrated in FIGS. 3 and 5, and the polarity of the power supply voltage Vs is defined as negative when the terminal on the upper side of the AC power supply 1 has a negative potential as illustrated in FIGS. 4 and 6.

When the switching operation of the first upper-arm switching element 311, the first lower-arm switching element 312, the second upper-arm switching element 321, and the second lower-arm switching element 322 is not performed, as illustrated in FIG. 3 or 4, a current for charging the smoothing capacitor 5 flows in accordance with the polarity of the power supply voltage Vs.

On the other hand, when the first lower-arm switching element 312 is turned ON while the power supply voltage Vs has a positive polarity, as illustrated in FIG. 5, a short-circuit path can be formed in a path through the AC power supply 1, the reactor 2, the first lower-arm switching element 312, the second lower-arm switching element 322, and the AC power supply 1. Further, when the first upper-arm switching element 311 is turned ON while the power supply voltage Vs has a negative polarity, as illustrated in FIG. 6, a short-circuit path can be formed in a path through the AC power supply 1, the second upper-arm switching element 321, the first upper-arm switching element 311, the reactor 2, and the AC power supply 1.

In the electric motor drive device 200 according to the first embodiment, switching control of these operation modes is performed under the control of the first control device 8. The power supply current Is and the bus voltage Vdc can be switched by the switching control of the operation modes.

Note that the configuration of the booster circuit 3 illustrated in FIG. 2 is an example, and a booster circuit having a configuration other than that of FIG. 2 may be used as long as the booster circuit has a booster function.

Figure 7:
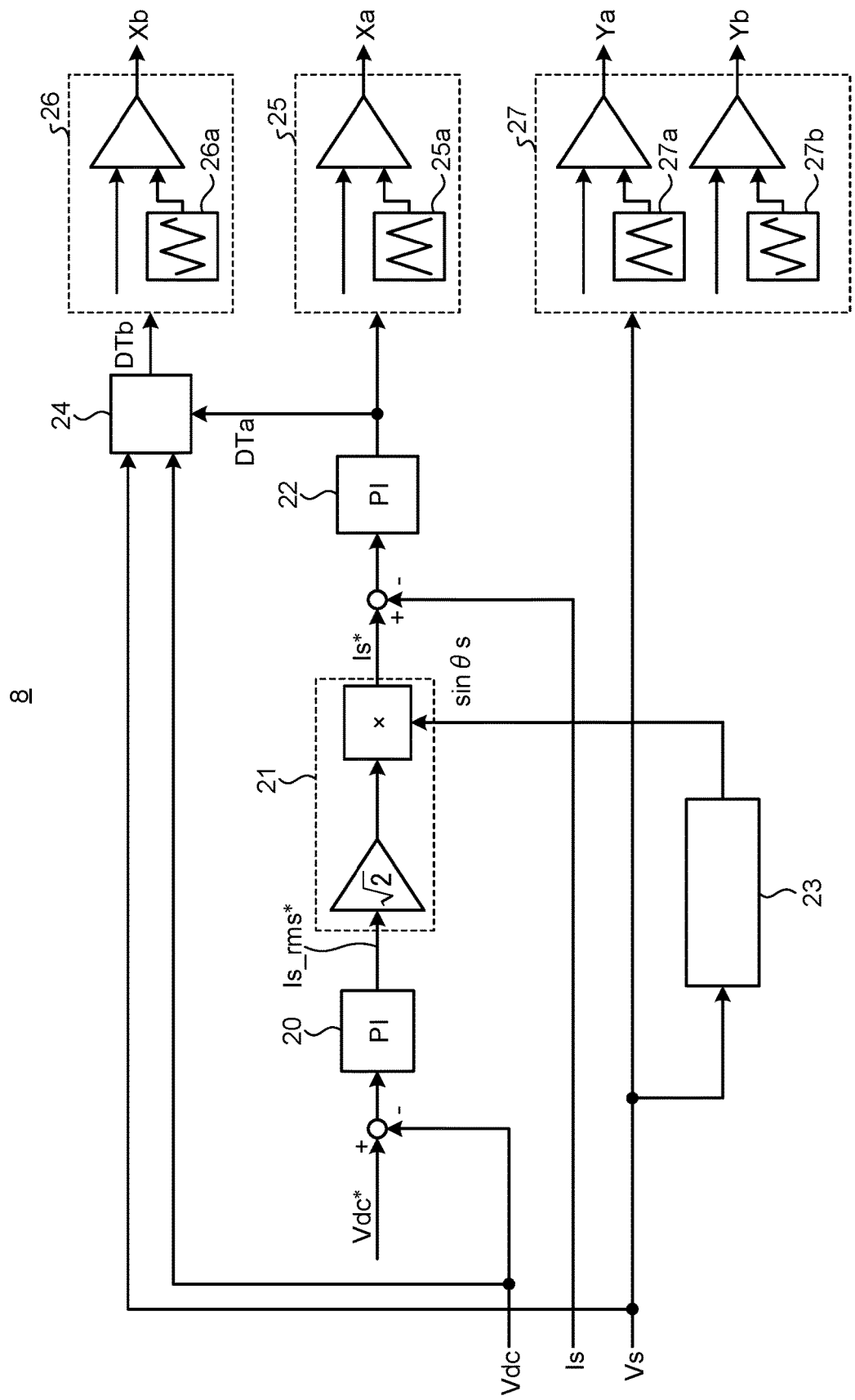
FIG. 7 is a block diagram illustrating an exemplary configuration of a first control device according to the first embodiment.

FIG. 7 is a block diagram illustrating an exemplary configuration of the first control device 8 according to the first embodiment. As illustrated in FIG. 7, the first control device 8 includes a power supply current command value control unit 20, a power supply current command value calculation unit 21, an on-duty control unit 22, a power supply voltage phase calculation unit 23, an on-duty calculation unit 24, a first drive pulse generation unit 25, a second drive pulse generation unit 26, and a synchronous drive pulse generation unit 27.

The power supply current command value control unit 20 calculates a power supply current effective value command value Is_rms* on the basis of a deviation between the bus voltage Vdc detected by the second voltage detector 10 and a preset bus voltage command value Vdc*. The calculation of the power supply current effective value command value Is_rms* is achieved by performing proportional integral (PI) control on the deviation between the bus voltage Vdc and the bus voltage command value Vdc*. Note that the PI control is an example, and proportional (P) control or proportional integral differential (PID) control may be adopted instead of the PI control.

The power supply voltage phase calculation unit 23 estimates a power supply voltage phase estimated value es on the basis of the power supply voltage Vs detected by the first voltage detector 6. The power supply voltage phase calculation unit 23 generates a sine value sin θs of the power supply voltage phase estimated value θs on the basis of the power supply voltage phase estimated value es.

The power supply current command value calculation unit 21 calculates a power supply current instantaneous value command value Is*. As in the illustration, the power supply current instantaneous value command value Is' can be obtained by multiplying the power supply current effective value command value Is_rms* output from the power supply current command value control unit 20 by the sine value sin θs of the power supply voltage phase estimated value θs output from the power supply voltage phase calculation unit 23.

The on-duty control unit 22 calculates an on-duty DTa on the basis of the power supply current instantaneous value command value Is' and the power supply current Is. The on-duty DTa is a calculated duty value that is referred to when the first drive pulse Xa for turning ON the first lower-arm switching element 312 is generated.

The calculation of the on-duty DTa is performed by performing PI control on a deviation between the power supply current effective value command value Is_rms* and the power supply current Is. Note that the on-duty control unit 22 may also adopt P control or PID control instead of the PI control.

The on-duty calculation unit 24 calculates an on-duty DTb on the basis of the power supply voltage Vs, the bus voltage Vdc, and the on-duty DTa. The on-duty DTb is a calculated duty value that is referred to when the second drive pulse Xb for turning ON the first upper-arm switching element 311 is generated.

The first drive pulse generation unit 25 generates the first drive pulse Xa by comparing the on-duty DTa with an amplitude of a first triangular wave 25a which is a carrier wave. The second drive pulse generation unit 26 generates the second drive pulse Xb by comparing the on-duty DTb with an amplitude of a second triangular wave 26a which is a carrier wave. Note that the first triangular wave 25a used in the first drive pulse generation unit 25 and the second triangular wave 26a used in the second drive pulse generation unit 26 are 180° out of phase with each other.

The synchronous drive pulse generation unit 27 generates the synchronous drive pulse Ya by comparing the power supply voltage Vs with an amplitude of a third triangular wave 27a which is a carrier wave. Further, the synchronous drive pulse generation unit 27 generates the synchronous drive pulse Yb by comparing the power supply voltage Vs with an amplitude of a fourth triangular wave 27b which is a carrier wave. The third triangular wave 27a used to generate the synchronous drive pulse Ya and the fourth triangular wave 27b used to generate the synchronous drive pulse Yb are 180° out of phase with each other.

Figure 8:
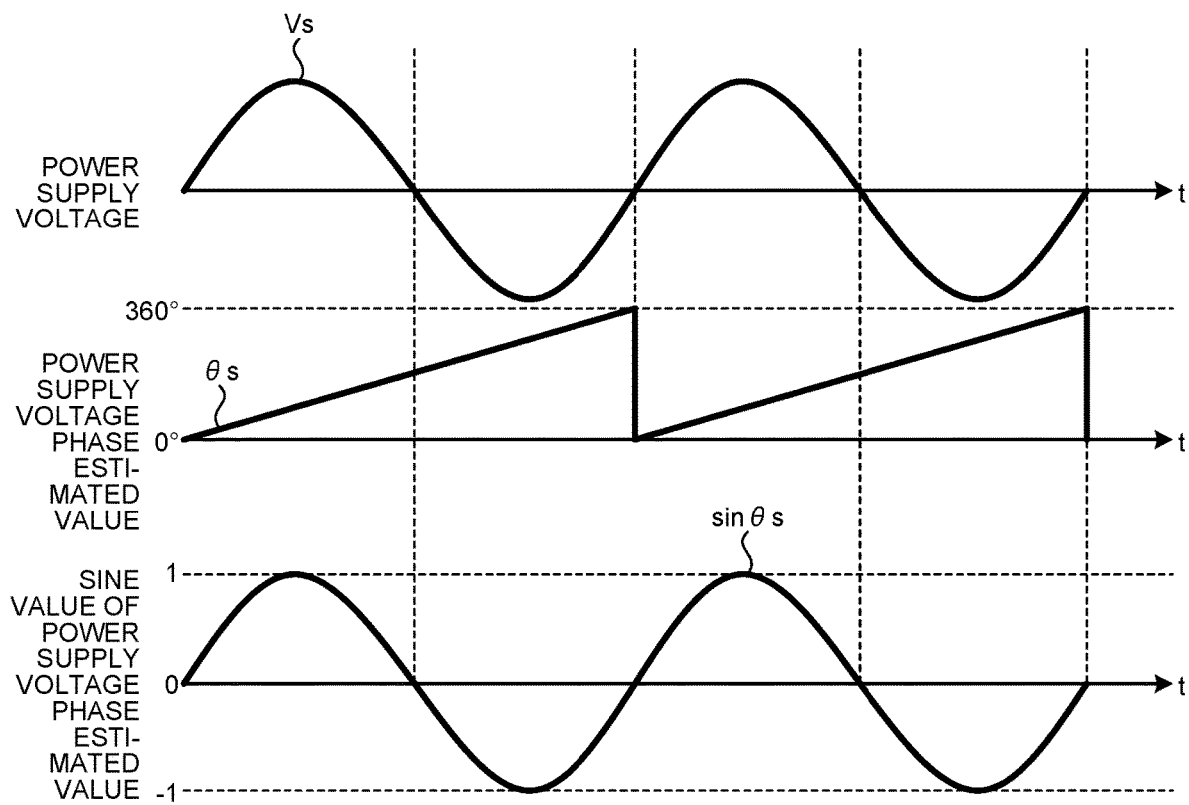
FIG. 8 is a diagram illustrating an example of an operation of a power supply voltage phase calculation unit illustrated in FIG. 7.

FIG. 8 is a diagram illustrating an example of an operation of the power supply voltage phase calculation unit 23 illustrated in FIG. 7. FIG. 8 illustrates waveforms of the power supply voltage Vs, the power supply voltage phase estimated value es, and the sine value sines of the power supply voltage phase estimated value es in order from the upper side. Note that FIG. 8 illustrates waveforms under an ideal condition in which a delay due to control or a delay due to detection processing is not considered.

As illustrated in FIG. 8, the power supply voltage phase estimated value θs is 360° at a point where the power supply voltage Vs is switched from the negative polarity to the positive polarity. The power supply voltage phase calculation unit 23 detects a point at which the power supply voltage Vs switches from the negative polarity to the positive polarity, and resets the power supply voltage phase estimated value θs, that is, returns the power supply voltage phase estimated value θs to 0°, at this switching point. Note that, in a case of using an interrupt function of a processor, a circuit that detects zero crossing of the power supply voltage Vs may be added to FIG. 7. In any case, any method may be used as long as a phase of the power supply voltage Vs can be detected.

Figure 9:
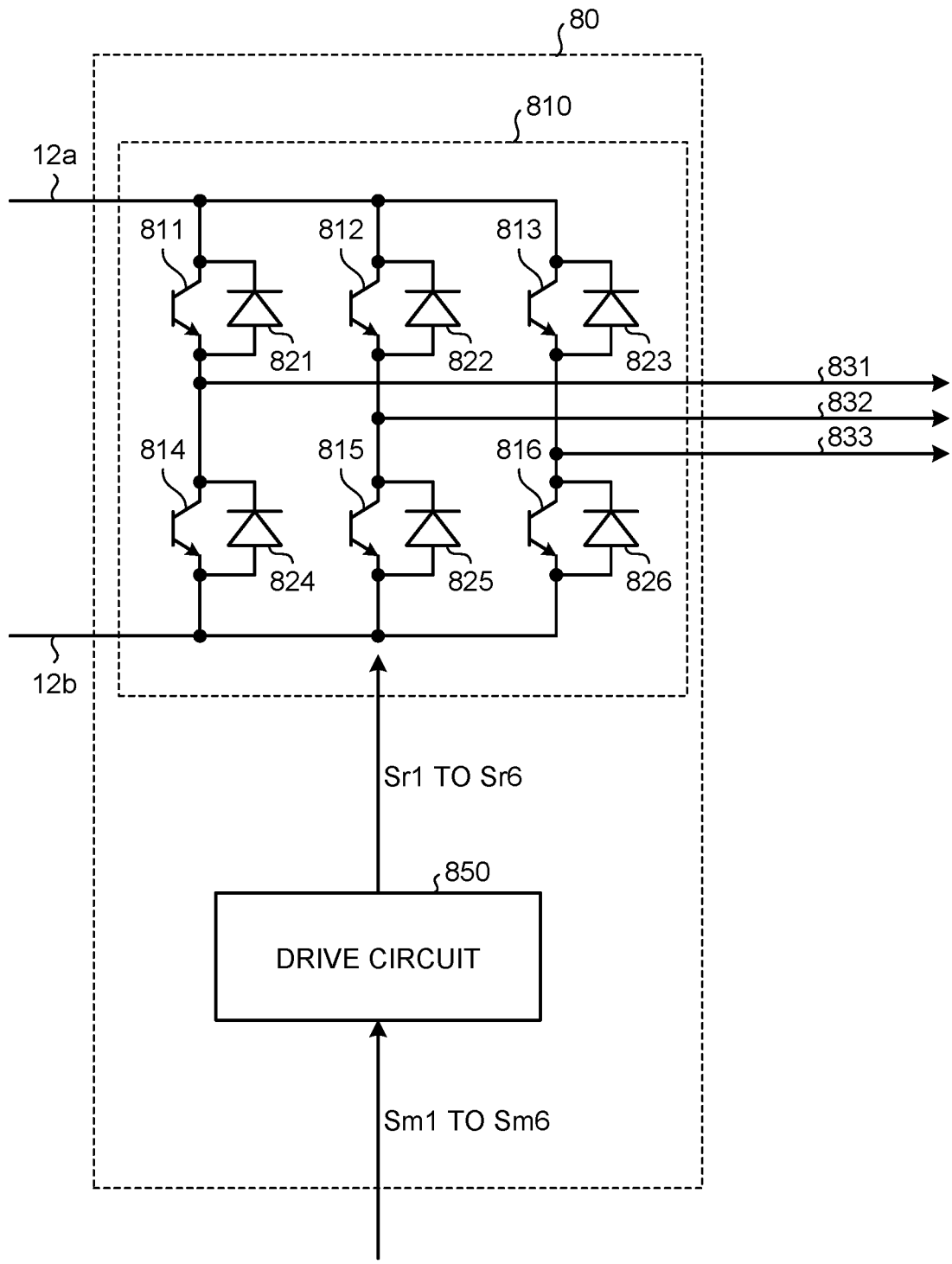
FIG. 9 is a diagram illustrating an exemplary configuration of an inverter illustrated in FIG. 2.

FIG. 9 is a diagram illustrating an exemplary configuration of the inverter 80 illustrated in FIG. 2. As illustrated in FIG. 9, the inverter 80 includes an inverter main circuit 810 and a drive circuit 850, and an input terminal of the inverter main circuit 810 is connected to the DC buses 12a and 12b. The bus voltage Vdc is applied to the inverter main circuit 810.

The inverter main circuit 810 includes six arm switching elements 811 to 816. Freewheeling rectifying elements 821 to 826 are connected in antiparallel with the switching elements 811 to 816.

The drive circuit 850 generates drive signals Sr1 to Sr6 on the basis of the PWM signals Sm1 to Sm6. The drive signals Sr1 to Sr6 control ON/OFF of the switching elements 811 to 816. At this time, an AC voltage having a variable frequency and a variable voltage value is generated and applied to the electric motor 7. That is, the inverter 80 drives the electric motor 7 by applying the AC voltage having a variable frequency and a variable voltage value to the electric motor 7, on the basis of the PWM signals Sm1 to Sm6 output from the second control device 100.

The PWM signals Sm1 to Sm6 have magnitude (0 to 5 V) of a signal level of a logic circuit, whereas the drive signals Sr1 to Sr6 are signals having a voltage level necessary for controlling the switching elements 811 to 816, for example, magnitude of +15 V to −15 V. Further, the PWM signals Sm1 to Sm6 use a ground potential of the second control device 100 as a reference potential, whereas the drive signals Sr1 to Sr6 each use a potential of an emitter terminal which is a negative terminal of a corresponding switching element as a reference potential.

Note that, although FIG. 9 illustrates a case where the switching elements 811 to 816 are IGBTs, the switching elements 811 to 816 are not limited thereto. Any element may be used as long as the element can perform the switching operation. Note that, in a case where the switching elements 811 to 816 are MOSFETs, since the switching elements 811 to 816 have a parasitic diode in structure, the switching elements 811 to 816 do not need to have the freewheeling rectifying element 821 to 826.

As the switching elements 811 to 816 and the rectifying element 821 to 826, a semiconductor element formed of a silicon-based material is generally used, but the switching elements 811 to 816 and the rectifying element 821 to 826 are not limited thereto. As the switching elements 811 to 816 and the rectifying element 821 to 826, a switching element formed of a wide band gap (WBG) semiconductor of silicon carbide, gallium nitride, gallium oxide, diamond or the like may be used. By using the switching element and the rectifying element formed of a WBG semiconductor, a device with a lower loss can be configured.

Figure 10:
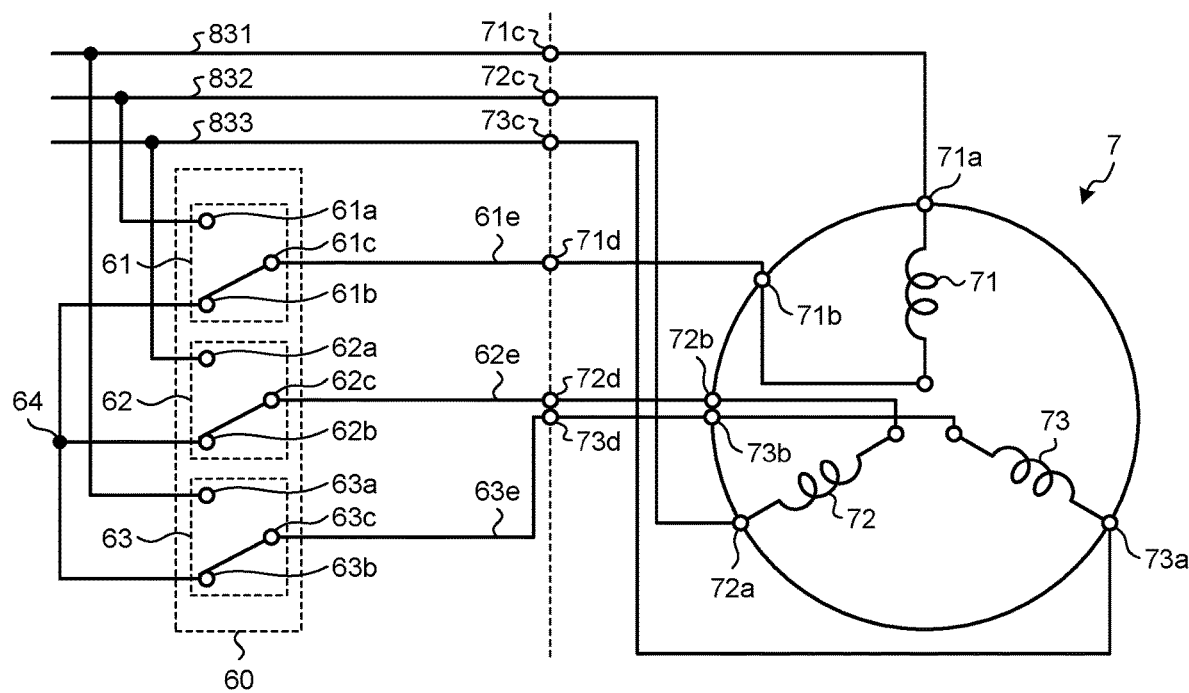
FIG. 10 is a diagram illustrating in detail a connection mode between a connection switching device and the electric motor illustrated in FIG. 2.
Figure 11:
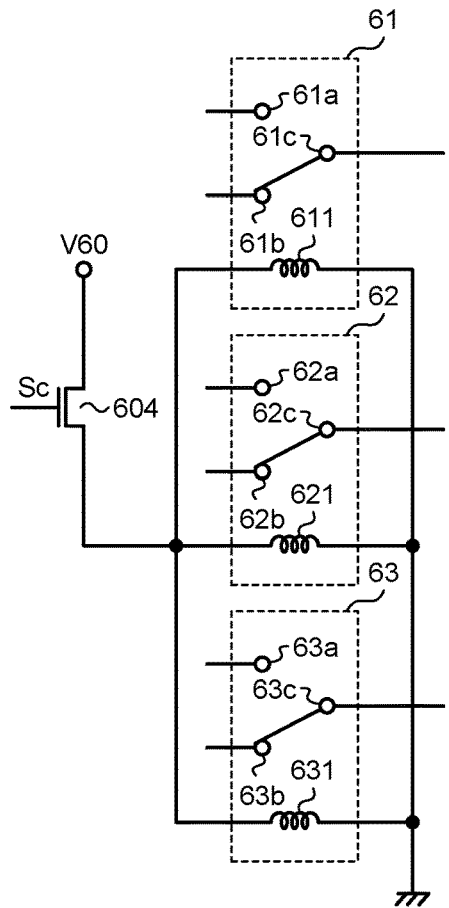
FIG. 11 is a diagram illustrating a detailed configuration of a switching unit of the connection switching device illustrated in FIG. 2.

FIG. 10 is a wiring diagram illustrating in detail a connection mode between the connection switching device 60 and the electric motor 7 illustrated in FIG. 2. FIG. 11 is a diagram illustrating a detailed configuration of the switching units 61, 62, and 63 of the connection switching device 60 illustrated in FIG. 2.

In FIG. 10, first end portions 71a, 72a, and 73a of the windings 71, 72, and 73 of three phases including a U-phase, a V-phase, and a W-phase of the electric motor 7 are connected to external terminals 71c, 72c, and 73c, respectively. Further, the second end portions 71b, 72b, and 73b of the windings 71, 72, and 73 of the U-phase, the V-phase, and the W-phase are connected to external terminals 71d, 72d, and 73d, respectively. The external terminals 71c, 72c, 73c, 71d, 72d, and 73d are terminals that can be connected to a device external to the electric motor 7. Output lines 831, 832, and 833 of the U-phase, the V-phase, and the W-phase of the inverter 80 are connected to the external terminals 71c, 72c, and 73c.

As described above, the connection switching device 60 includes the switching units 61, 62, and 63. Currents flowing through the windings 71, 72, and 73 flow through the switching units 61, 62, and 63, respectively. The switching units 61, 62, and 63 switch paths of the currents flowing through the windings 71, 72, and 73, respectively. As the switching units 61, 62, and 63, electromagnetic contactors whose contacts are electromagnetically opened and closed are used. Such electromagnetic contactors include those referred to as a relay, a contactor, and the like. The switching units 61, 62, and 63 are configured as illustrated in FIG. 11, for example. In FIG. 11, the contacts of the switching units 61, 62, and 63 are configured to be in different states of connection when a current flows through excitation coils 611, 621, and 631 and when a current does not flow.

In FIG. 11, the excitation coils 611, 621, and 631 are connected so as to receive the switching power supply voltage V60 via a semiconductor switch 604. Opening/closing of the semiconductor switch 604 is controlled by the connection selection signal Sc output from the second control device 100. For example, the semiconductor switch 604 is turned OFF when the connection selection signal Sc has a first value, and the semiconductor switch 604 is turned ON when the connection selection signal Sc has a second value. The first value is, for example, a logical value "Low", and the second value is, for example, a logical value "High". The relationship of those may be reversed. Note that, in a case where the connection selection signal Sc is output from a circuit having a sufficient current capacity, a configuration may be adopted in which a current according to the connection selection signal Sc flows directly from the circuit to the excitation coils 611, 621, and 631. In this case, the semiconductor switch 604 is unnecessary.

Note that the semiconductor switch 604 is generally formed using a semiconductor element formed of a silicon-based material, but is not limited thereto. As the semiconductor switch 604, a semiconductor element formed of a WBG semiconductor may be used. By using a switching element formed of a WBG semiconductor, a device with a lower loss can be configured.

Returning to FIG. 10, a common contact 61c of the switching unit 61 is connected to the external terminal 71d via a lead wire 61e, a normally closed contact 61b is connected to a neutral point node 64, and a normally open contact 61a is connected to the V-phase output line 832 of the inverter 80. A common contact 62c of the switching unit 62 is connected to the external terminal 72d via a lead wire 62e, a normally closed contact 62b is connected to the neutral point node 64, and a normally open contact 62a is connected to the W-phase output line 833 of the inverter 80. A common contact 63c of the switching unit 63 is connected to the external terminal 73d via a lead wire 63e, a normally closed contact 63b is connected to the neutral point node 64, and a normally open contact 63a is connected to the U-phase output line 831 of the inverter 80.

In FIG. 11, when no current flows through the excitation coils 611, 621, and 631, the switching units 61, 62, and 63 are in a state switched to the normally closed contact side as in the illustration, that is, the common contacts 61c, 62c, and 63c are in a state connected to the normally closed contacts 61b, 62b, and 63b. In this state, the electric motor 7 is in the Y connection state. When a current flows through the excitation coils 611, 621, and 631, the switching units 61, 62, and 63 are in a state switched to the normally open contact side contrary to the illustration, that is, the common contacts 61c, 62c, and 63c are in a state connected to the normally open contacts 61a, 62a, and 63a. In this state, the electric motor 7 is in the Δ connection state.

Figure 12:
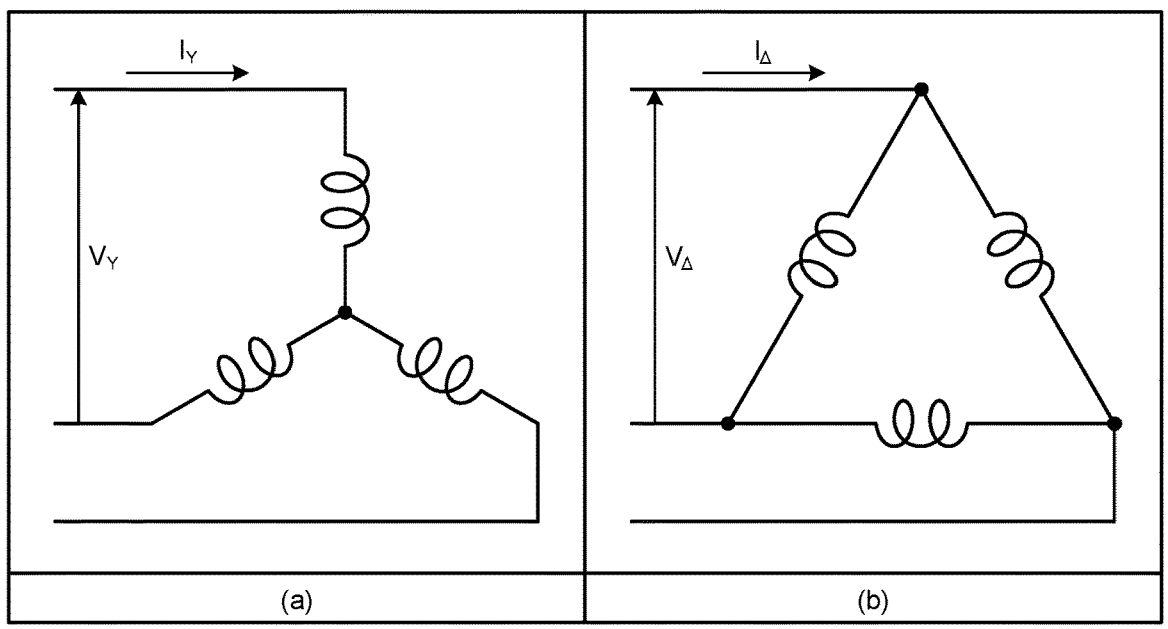
FIG. 12 is a diagram illustrating two connection states to be switched in the electric motor illustrated in FIG. 2.

Here, with reference to FIG. 12, an advantage of using an electric motor capable of switching to either the Y connection or the Δ connection as the electric motor 7 will be described. FIG. 12 is a diagram illustrating two connection states to be switched in the electric motor 7 illustrated in FIG. 2.

In FIG. 12, (a) illustrates a state of connection when three windings are set to the Y connection, and (b) illustrates a state of connection when three windings are set to the Δ connection. It is assumed that $V_Y$ is a line voltage at the time of the Y connection, $I_Y$ is an inflowing current, $V_\Delta$ is a line voltage at the time of the Δ connection, and $I_\Delta$ is an inflowing current, and voltages applied to the windings of the individual phases are equal to each other. At this time, the relationship of the following Formula (1) is established between the voltage $V_Y$ and the voltage $V_\Delta$.

$$V_\Delta = V_Y/\sqrt{3} \tag{1}$$

In addition, the relationship of the following Formula (2) is established between the current $I_Y$ and the current $I_\Delta$.

$$I_\Delta = \sqrt{3} \times I_Y \quad (2)$$

When the voltage $V_Y$ and the current $I_Y$ at the time of the Y connection and the voltage $V_\Delta$ and the current $I_\Delta$ at the time of the Δ connection have the relationships of the above Formulas (1) and (2), electric power supplied to the electric motor 7 is equal for the Y connection and the Δ connection. That is, when the electric powers supplied to the electric motor 7 are equal to each other, a current necessary for driving is larger in the Δ connection, and conversely, a voltage necessary for driving is lower in the Δ connection.

Using the properties described above, it is conceivable to select a connection state in accordance with a load condition or the like. For example, it is conceivable to operate at a low speed in the Y connection at the time of a low load, and operate at a high speed in the Δ connection at the time of a high load. By doing in such a way, the efficiency at the time of low load can be improved, and high output at the time of high load can be achieved.

This property will be described in detail by taking, as an example, a case where the electric motor 7 drives a compressor of an air conditioner.

As the electric motor 7 for driving a compressor in an air conditioner, a synchronous electric motor using a permanent magnet for a rotor is widely used in order to meet a demand for energy saving. Further, in air conditioners in recent years, when a difference between a room temperature and a set temperature is large, the electric motor 7 is rotated at a high speed to quickly bring the room temperature close to the set temperature. On the other hand, when the room temperature is close to the set temperature, the electric motor 7 is rotated at a low speed to maintain the room temperature. In a case of such an operation pattern, a proportion occupied by the time for driving at a low speed increases.

In a case of using the synchronous electric motor, when a rotation speed increases, a counter electromotive force increases and a voltage value necessary for driving increases. As described above, the counter electromotive force is higher in the Y connection than in the Δ connection.

In order to reduce the counter electromotive force in a high-speed rotation region, it is conceivable to reduce a magnetic force of the permanent magnet or reduce the number of turns of stator windings. However, in this case, since a current for obtaining the same output torque increases, a current flowing through the electric motor 7 and the inverter 80 increases; therefore, the efficiency of the device decreases.

For this reason, it is conceivable to switch the connection state in accordance with the rotation speed. For example, in the high-speed rotation region requiring high-speed operation, the connection state is set to the Δ connection. By doing in this way, a voltage value necessary for driving can be $1/\sqrt{3}$ times that in the Y connection. This eliminates the need to reduce the number of turns of the windings and also eliminates the need to use magnetic flux weakening control.

On the other hand, in a low-speed rotation region in which operation can be performed at a low speed, the connection state is set to the Y connection. By doing in this way, a current value necessary for driving can be $1/\sqrt{3}$ times that in the Δ connection. In addition, since the high-speed operation is not performed in the Y connection state, the windings in the Y connection state can be designed to be suitable for the low-speed driving. This makes it possible to reduce a current value as compared with a case where the Y connection is used over the entire speed range. As a result, a loss of the inverter 80 can be reduced, and the efficiency of the device can be increased.

Note that, in the high-speed rotation region, it is also conceivable to generate a voltage necessary for driving, by driving the booster circuit 3 and boosting the bus voltage Vdc. However, the efficiency is increased by operating in the Δ connection in which the necessary voltage is low rather than by boosting the bus voltage Vdc.

As described above, it is significant to switch the connection state of the windings 71, 72, and 73 of the electric motor 7 in accordance with the load condition. The connection switching device 60 is provided to enable such switching.

Figure 13:
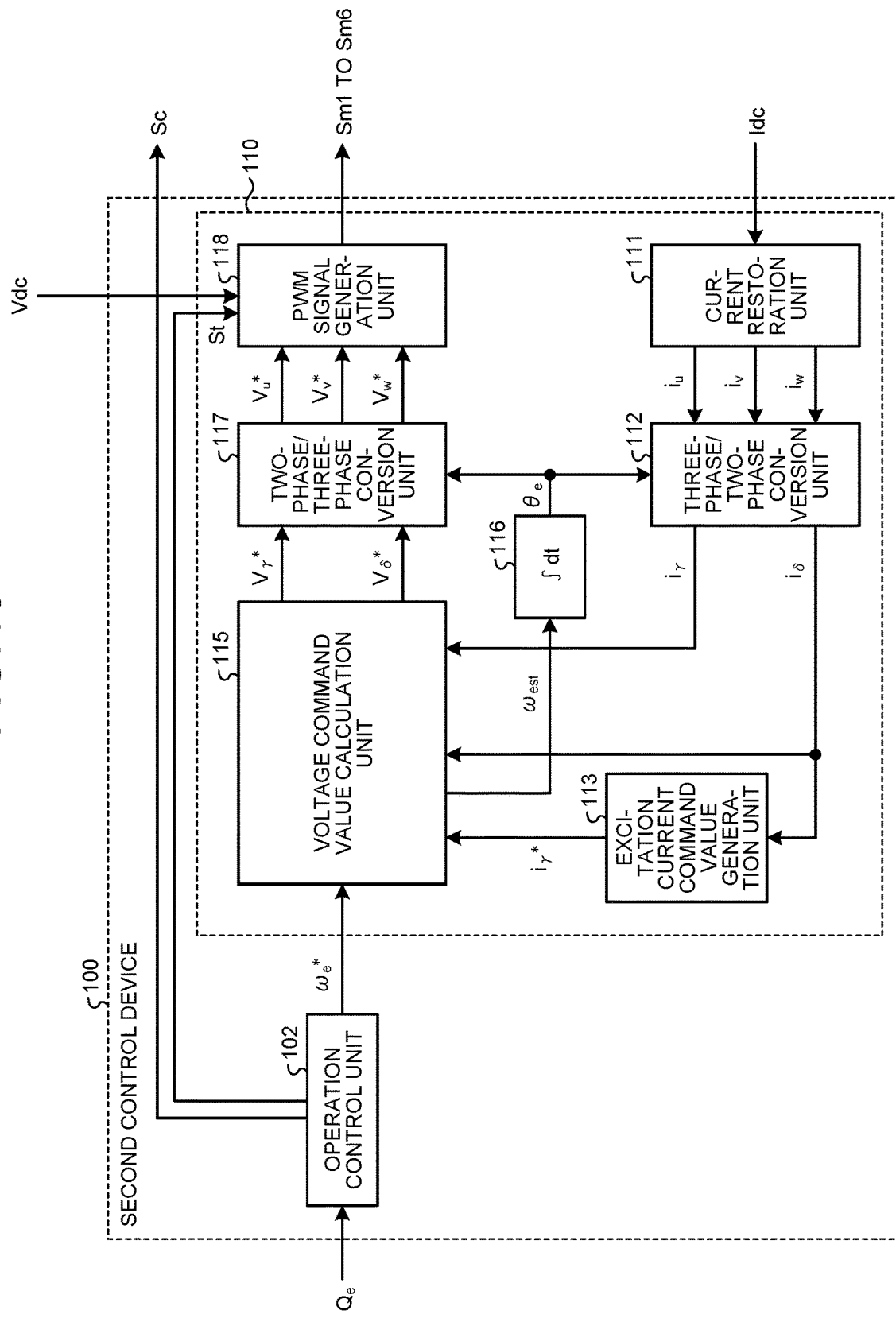
FIG. 13 is a block diagram illustrating an exemplary configuration of a second control device according to the first embodiment.

FIG. 13 is a block diagram illustrating an exemplary configuration of the second control device 100 according to the first embodiment. In FIG. 13, the second control device 100 includes an operation control unit 102 and an inverter control unit 110.

The operation control unit 102 receives command information $Q_e$ from outside, and generates a stop signal St, the connection selection signal Sc, and a frequency command value $\omega_e^*$ on the basis of the command information $Q_e$. The stop signal St is a signal for stopping the operation of the inverter 80. The connection selection signal Sc is a signal for selecting the connection state of the windings 71, 72, and 73 described above. When a command value of a rotation speed of the electric motor 7 is "$\omega_m^*$" and the number of pole pairs of the electric motor is "$P_m$", the frequency command value $\omega_e^*$ can be obtained by $\omega_e^* = \omega_m^* \times P_m$.

When controlling an air conditioner as the refrigeration cycle application device 900, the second control device 100 controls an operation of each unit of the air conditioner on the basis of the command information $Q_e$. The command information $Q_e$ is, for example, a temperature detected by a temperature sensor (not illustrated), information indicating a set temperature indicted by a remote controller which is an operation unit (not illustrated), operation mode selection information, instruction information for operation start and operation end, and the like. The operation mode selection information includes selection information based on the connection selection signal Sc in the case of the electric motor 7 in the first embodiment, in addition to, for example, heating, cooling, dehumidification, and the like. The operation control unit 102 may be external to the second control device 100. That is, the second control device 100 may be configured to acquire the frequency command value $\omega_e^*$ from outside.

Here, a description is given to a change in the frequency command value $\omega_e^*$ and a behavior of the air conditioner when the Δ connection and the Y connection are selected in this order by the connection selection signal Sc. First, the Δ connection is selected at the time of activation, and the frequency command value $\omega_e^*$ gradually increasing to a frequency corresponding to a first target rotation speed after activation is generated. When the frequency command value $\omega_e^*$ reaches the frequency corresponding to the first target rotation speed, this state is maintained until the room temperature approaches the set temperature. When the room temperature comes close to the set temperature, the electric motor 7 is temporarily stopped and switched to the Y connection. After switching to the Y connection, reactivation is performed, and the frequency command value $\omega_e^*$ gradually increasing to a frequency corresponding to a second target rotation speed lower than the first target rotation speed is generated. After the frequency command value $\omega_e^*$ reaches the frequency corresponding to the second target rotation speed, control for maintaining a state where the room temperature is close to the set temperature is performed.

Next, the inverter control unit 110 will be described. As illustrated in FIG. 13, the inverter control unit 110 includes a current restoration unit 111, a three-phase/two-phase conversion unit 112, an excitation current command value generation unit 113, a voltage command value calculation unit 115, an electrical angle phase calculation unit 116, a two-phase/three-phase conversion unit 117, and a PWM signal generation unit 118.

The current restoration unit 111 restores phase currents $i_u$, $i_v$, and $i_w$ flowing through the electric motor 7, on the basis of the direct current Idc detected by the bus current detection unit 40. The current restoration unit 111 samples the direct current $I_{dc}$ detected by the bus current detection unit 40, at a timing determined on the basis of the PWM signals Sm1 to Sm6 generated by the PWM signal generation unit 118. This allows the phase currents $i_u$, $i_v$, and $i_w$ to be restored from the direct current $I_{dc}$.

The three-phase/two-phase conversion unit 112 converts the phase currents $i_u$, $i_v$ and $i_w$ restored by the current restoration unit 111 into a γ-axis current $i_\gamma$ which is an excitation current and a δ-axis current $i_\delta$ which is a torque current, that is, current values of γ-δ axes, by using an electrical angle phase $\theta_e$ generated by the electrical angle phase calculation unit 116.

On the basis of the δ-axis current is, the excitation current command value generation unit 113 obtains a γ-axis current command value $i_\gamma^*$ for achieving the best efficiency for driving the electric motor 7. The γ-axis current command value $i_\gamma^*$ for achieving the best efficiency is obtained when a current phase $\beta_m$ in which an output torque $T_m$ is equal to or larger than a specified value or to be maximum is obtained, that is, when the current phase $\beta_m$ in which the current value is equal to or smaller than a specified value or to be minimum is obtained. Note that, in FIG. 13, the γ-axis current command value $i_\gamma^*$ is obtained on the basis of the δ-axis current is which is a torque current component, but the γ-axis current command value $i_\gamma^*$ may be obtained on the basis of the γ-axis current $i_\gamma$, and a frequency command value ω*.

On the basis of the frequency command value $\omega_e^*$ acquired from the operation control unit 102, the γ-axis current $i_\gamma$ and the δ-axis current $i_\delta$ acquired from the three-phase/two-phase conversion unit 112, and the γ-axis current command value $i_\gamma^*$ acquired from the excitation current command value generation unit 113, the voltage command value calculation unit 115 generates a γ-axis voltage command value $V_\gamma^*$ and a δ-axis voltage command value $V_\delta^*$. Further, the voltage command value calculation unit 115 estimates a frequency estimation value west on the basis of the γ-axis voltage command value $V_\gamma^*$, the δ-axis voltage command value $V_\delta^*$, the γ-axis current $i_\gamma$, and the δ-axis current $i_\delta$. A detailed operation of the voltage command value calculation unit 115 will be described later.

The electrical angle phase calculation unit 116 calculates the electrical angle phase $\theta_e$ by integrating the frequency estimation value $\omega_{est}$ acquired from the voltage command value calculation unit 115.

The two-phase/three-phase conversion unit 117 converts the γ-axis voltage command value $V_\gamma^*$ and the δ-axis voltage command value $V_\delta^*$ acquired from the voltage command value calculation unit 115, that is, voltage command values of a two-phase coordinate system, into three-phase voltage command values $V_u^*$, $V_v^*$, and $V_W^*$ which are output voltage command values of a three-phase coordinate system, by using the electrical angle phase θe acquired from the electrical angle phase calculation unit 116.

The PWM signal generation unit 118 compares the three-phase voltage command values $V_u^*$, $V_v^*$, and $V_W^*$ acquired from the two-phase/three-phase conversion unit 117 with the bus voltage Vdc detected by the second voltage detector 10, to generate the PWM signals Sm1 to Sm6. Note that the PWM signal generation unit 118 can stop the electric motor 7 by not outputting the PWM signals Sm1 to Sm6.

When the above-described stop signal St is generated by the operation control unit 102, the generated stop signal St is provided to the PWM signal generation unit 118. Upon receiving the stop signal St, the PWM signal generation unit 118 stops outputting the PWM signals Sm1 to Sm6. As a result, the switching elements 811 to 816 of the inverter main circuit 810 stop the switching operation.

Note that, in the example described above, a configuration is adopted in which the phase currents $i_u$, $i_v$, and $i_w$ are restored from the direct current Idc on the input side of the inverter 80. However, a configuration may be adopted in which a current detector is provided in the output lines 831, 832, and 833 of the inverter 80, and the phase current is detected by the current detector. In this case, the current detected by the current detector may be simply used instead of the current restored by the current restoration unit 111.

Next, a description is given to an operation of the electric motor drive device 200 when the connection switching device 60 is operated during operation of the electric motor 7.

First, problems of related art, that is, an operation in an electric motor drive device not including the features of the present disclosure will be described.

During operation of the electric motor 7, that is, in a state where a current flows through the switching units 61, 62, and 63 constituting the connection switching device 60, when the current flowing through the excitation coils 611, 621, and 631 is manipulated, connection of the common contacts 61c, 62c, and 63c is switched between the normally closed contacts 61b, 62b, and 63b and the normally open contacts 61a, 62a, and 63a, respectively. On the other hand, power supply from the inverter 80 to the electric motor 7 continues during operation of the electric motor 7. Therefore, when the switching occurs, if a rotation speed of the electric motor 7 has not reached zero yet, arc discharge occurs between the individual contacts of the switching units 61, 62, and 63. When the arc discharge occurs, there is a possibility that a failure such as contact welding occurs in the switching units 61, 62, and 63.

In order to avoid such a failure, there is a control method of stopping power supply from the inverter 80 to the electric motor 7 to set the rotation speed of the electric motor 7 to zero before the connection switching device 60 is operated. By using this control method, it is possible to switch the connection state without causing arc discharge to occur between the individual contacts of the switching units 61, 62, and 63.

On the other hand, when the rotation speed of the electric motor 7 is set to zero, it may be difficult to restart the electric motor 7. For example, in a case where a load of the electric motor 7 is the compressor 901, the state where the rotation speed is zero is a state where the refrigerant is not stable. In a case of restarting from this state, torque necessary for restarting increases and thus a necessary current also increases; therefore, there is a possibility that the restart cannot be performed, in the worst case. Therefore, it is necessary to restart the electric motor 7 after a lapse of time required for the state of the refrigerant to be sufficiently stabilized, without immediately operating the electric motor 7. By doing in such a way, the refrigerant can no longer be pressurized by the compressor 901, and the room temperature may be increased or decreased due to a decrease in air conditioning capacity, and the room temperature may not be kept constant.

Therefore, in the electric motor drive device 200 according to the present disclosure, control is performed such that a current flowing through the electric motor 7 or the connection switching device 60 during operation of the electric motor 7 is zero. Hereinafter, this control method is referred to as "zero current control". When the connection switching device 60 is operated using the zero current control, it is possible to prevent arc discharge that may occur between the individual contacts of the switching units 61, 62, and 63. This makes it possible to switch the connection state of the electric motor 7 without setting the rotation speed of the electric motor 7 to zero, that is, without stopping the electric motor 7. When the zero current control is used, it is not necessary to stop the electric motor 7 before and after the switching of the connection state, so that a standby time for stabilizing the refrigerant of the compressor 901 is unnecessary. Therefore, it is possible to prevent an increase or a decrease in room temperature due to a decrease in air conditioning capacity. Note that, in the zero current control, the current flowing through the electric motor 7 or the connection switching device 60 does not need to be completely zero, and a state where the current is regarded as zero is sufficient.

Figure 14:
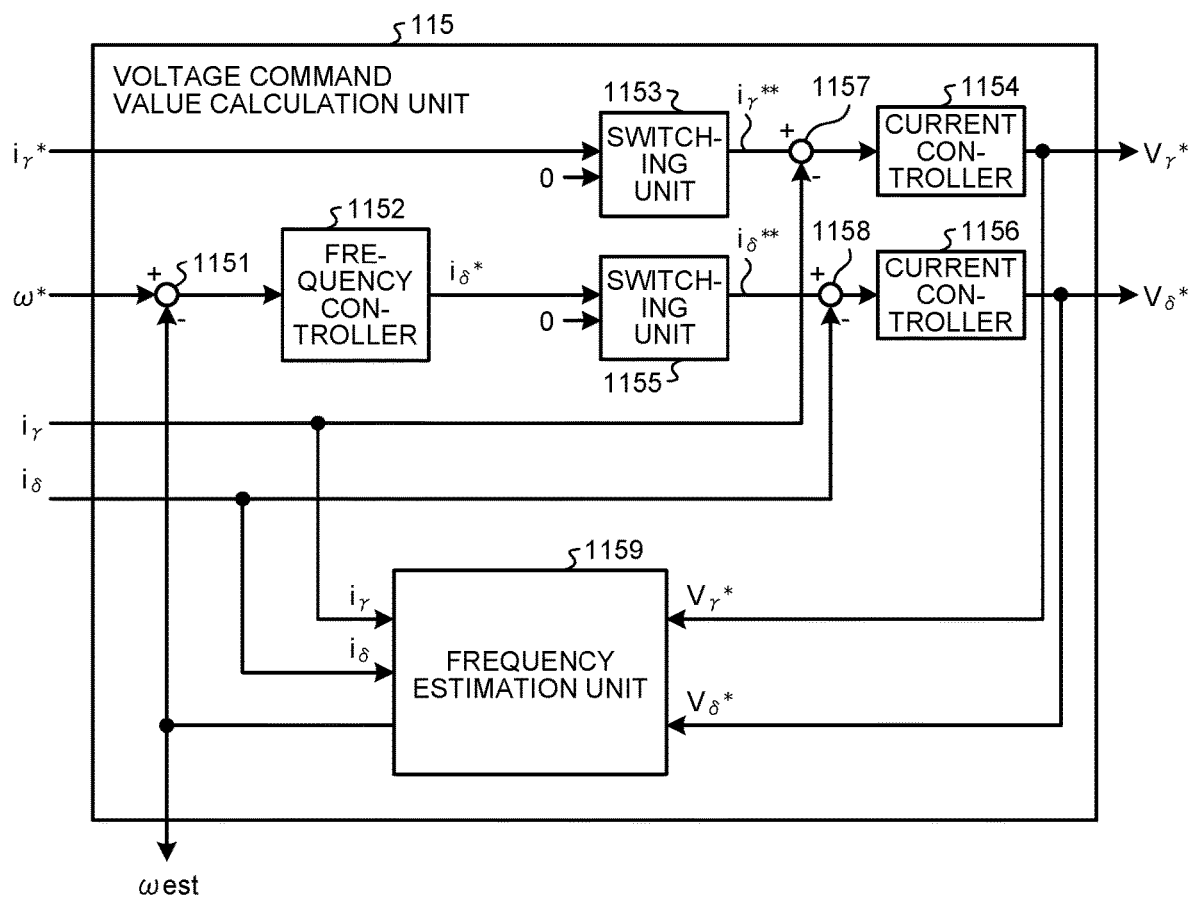
FIG. 14 is a diagram illustrating an exemplary configuration of a voltage command value calculation unit that implements zero current control in the first embodiment.
Figure 15:
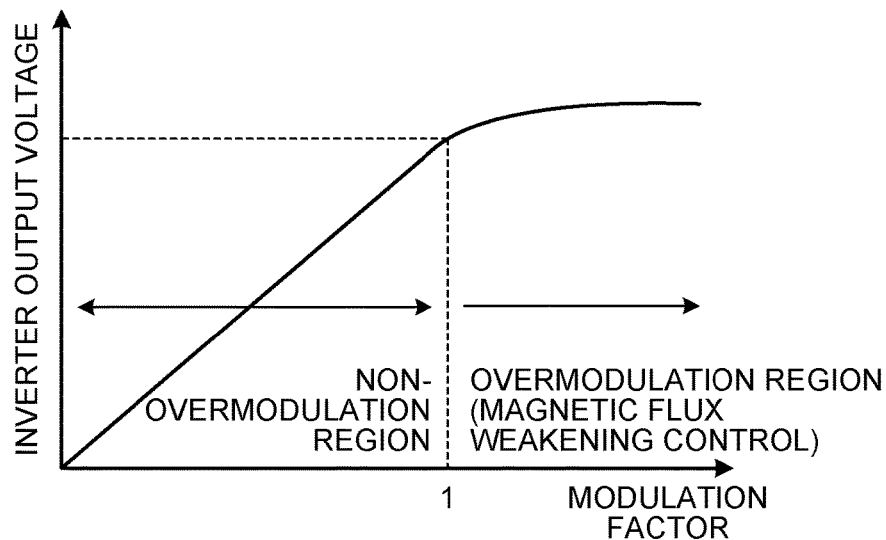
FIG. 15 is a graph to be used to describe matters to be attended to when the zero current control in the first embodiment is performed.
Figure 16:
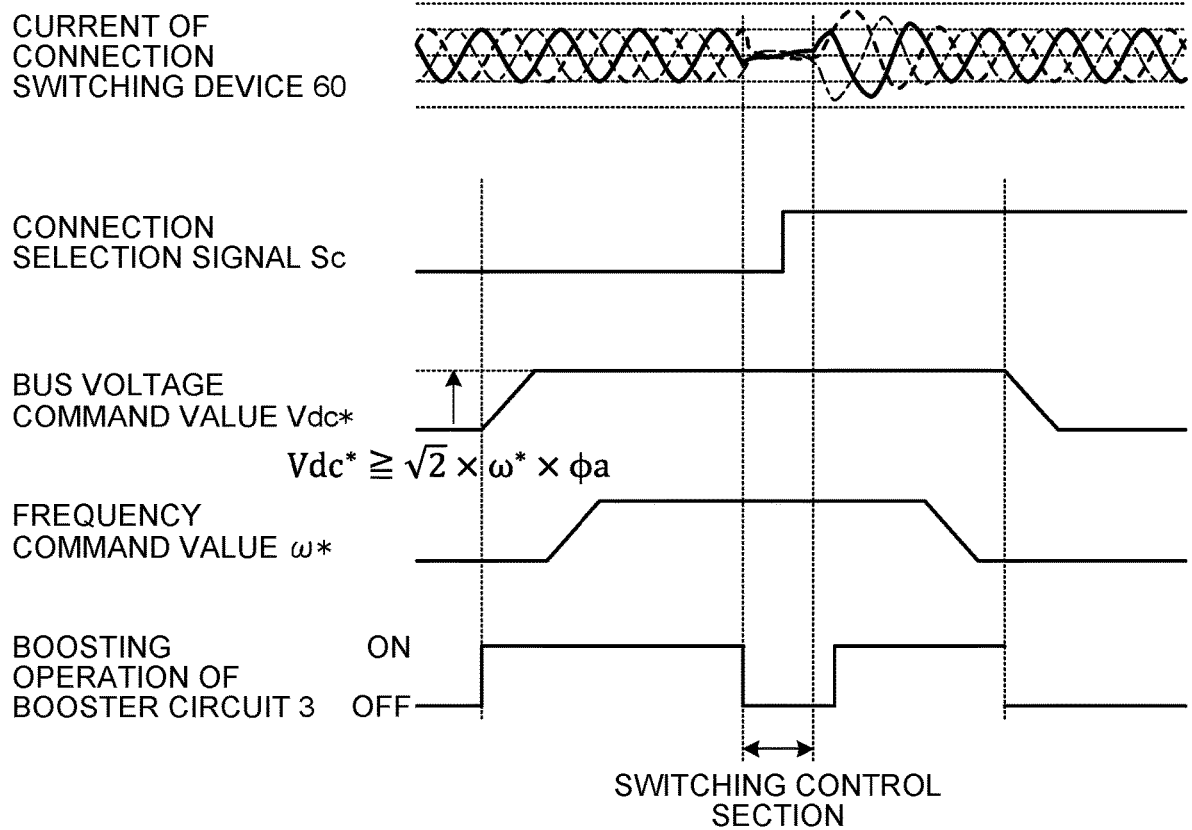
FIG. 16 is a diagram illustrating an example of a control sequence when the zero current control in the first embodiment is performed.

Next, with reference to the drawings of FIGS. 14 to 16, a description will be given of a configuration and an operation of the voltage command value calculation unit 115 that implements the above-described zero current control. FIG. 14 is a diagram illustrating an exemplary configuration of the voltage command value calculation unit 115 that implements the zero current control in the first embodiment. FIG. 15 is a graph used to describe matters to be attended to when the zero current control in the first embodiment is performed. FIG. 15 illustrates a relationship between a modulation factor to be applied to the inverter 80 and an inverter output voltage which is an output voltage of the inverter 80. FIG. 16 is a diagram illustrating an example of a control sequence when the zero current control in the first embodiment is performed. FIG. 16 illustrates waveforms of a current of the connection switching device 60, the connection selection signal Sc, the bus voltage command value Vdc*, the frequency command value ω*, and a boosting operation of the booster circuit 3, in order from the upper stage.

As illustrated in FIG. 14, the voltage command value calculation unit 115 includes subtractors 1151, 1157, and 1158, a frequency controller 1152, current controllers 1154 and 1156, switching units 1153 and 1155, and a frequency estimation unit 1159.

In FIG. 14, the frequency estimation unit 1159 estimates a frequency of the electric motor 7 on the basis of the γ-axis current $i_γ$, the δ-axis current $i_δ$, the γ-axis voltage command value $V_γ^*$, and the δ-axis voltage command value $V_δ^*$, and generates the frequency estimation value $ω_{est}$.

The subtractor 1151 obtains a difference value of the frequency estimation value $ω_{est}$ generated by the frequency estimation unit 1159, with respect to frequency command value ω*. The difference value is a value of "$ω^* - ω_{est}$".

The frequency controller 1152 performs, for example, PI control calculation on the difference value obtained by the subtractor 1151, to obtain a δ-axis current command value $i_δ^*$ for reducing the difference value. By generating such a δ-axis current command value $i_δ^*$, control for matching the frequency estimation value $ω_{est}$ with the frequency command value ω* is performed.

The switching unit 1153 selects either the γ-axis current command value $i_γ^*$ or the value 0, and outputs the selected command value to the subtractor 1157 as a γ-axis current command value $i_γ^{}$. Further, the switching unit 1155** selects either the δ-axis current command value $i_δ^*$ or the value 0, and outputs the selected command value to the subtractor 1158 as a δ-axis current command value $i_δ^{**}$. That is, either the γ-axis current command value $i_γ^*$ or the value 0 is output from the switching unit 1153 by switching, and either the δ-axis current command value $i_δ^*$ or the value 0 is output from the switching unit 1155 by switching.

The subtractor 1157 obtains a difference value of the output of the switching unit 1153 with respect to the γ-axis current $i_γ$, and outputs the difference value to the current controller 1154. The subtractor 1158 obtains a difference value of the output of the switching unit 1155 with respect to the δ-axis current is, and outputs the difference value to the current controller 1156.

The current controller 1154 performs, for example, PI control calculation on the difference value obtained by the subtractor 1157, to obtain the γ-axis voltage command value $V_γ^*$ for reducing the difference value. The current controller 1156 performs, for example, PI control calculation on the difference value obtained by the subtractor 1158, to obtain the δ-axis voltage command value $V_δ^*$ for reducing the difference value.

When the γ-axis current command value $i_γ^*$ is selected as the γ-axis current command value $i_γ^*$ in the switching unit 1153, control is performed to match the γ-axis current $i_γ$ with the γ-axis current command value $i_γ^*$. On the other hand, when the value 0 is selected as the γ-axis current command value $i_γ^{**}$, control is performed to set the γ-axis current $i_γ$ to zero. Further, when the δ-axis current command value $i_δ^*$ is selected as the δ-axis current command value $i_δ^{}$ in the switching unit 1155**, control is performed to match the 5-axis current $i_δ$ with the δ-axis current command value $i_δ^*$. On the other hand, when the value 0 is selected as the δ-axis current command value $i_δ^{**}$, control is performed to set the δ-axis current is to zero.

As illustrated in FIG. 14, operating the switching unit 1153 to select the value 0 as the γ-axis current command value $I_γ^{}$ and operating the switching unit 1155 to select the value 0 as the δ-axis current command value $I_δ^{}$ are an example of a method for implementing the zero current control in the first embodiment.

Note that, as another example of the zero current control in the first embodiment, a method of stopping output of the PWM signals Sm1 to Sm6 is also considered. When output of the inverter 80 is stopped in a state where a large current flows through the windings 71, 72, and 73 of the electric motor 7, there is a concern about generation of regenerative power or generation of a surge voltage. Therefore, it is also conceivable to switch a connection state of the windings 71, 72, and 73 by turning OFF all the outputs of the PWM signals Sm1 to Sm6 after performing the zero current control described above. In turning OFF the PWM signals Sm1 to Sm6, similarly to the zero current control illustrated in FIG. 14, no current flows when the following Formula (7) described below is satisfied. Note that, although other methods are conceivable for the zero current control, the description thereof will be omitted here.

Next, zero current control in consideration of an operation of the electric motor 7 will be described. First, a relationship between torque and speed in a general electric motor is expressed by the following Formula (3).

$$\Delta\omega=(Tm-Tl)/(Jm\cdot(1/t)) \quad (3)$$

In the above Formula (3), "$\Delta\omega$" represents a speed deviation, "Tm" represents an output torque, "Tl" represents a load torque, "Jm" represents an inertia moment, and "t" represents time.

Switching of the connection state of the windings 71, 72, and 73 requires a certain amount of time. Therefore, when switching the connection state of the windings 71, 72, and 73, it is necessary to continue the zero current control for a certain period of time. The output torque is zero during the period of the zero current control. For this reason, as the period of the zero current control is longer and the load torque is larger, a reduction range of the speed becomes larger. Therefore, when the zero current control is started at a low speed, the rotation speed may drop to near zero, and the electric motor 7 may be out of step.

Therefore, it is conceivable to perform the zero current control after increasing the rotation speed of the electric motor 7. However, as the rotation speed of the electric motor 7 increases, a counter electromotive force of the electric motor 7 increases, and thus it is necessary to output a voltage equal to or higher than the counter electromotive force from the inverter 80. However, as illustrated in FIG. 15, when the modulation factor to be applied to the inverter 80 exceeds one, a state enters a region where the inverter output voltage is saturated. A region where the modulation factor exceeds one is called an "overmodulation region", and a region where the modulation factor is one or less is called a "non-overmodulation region".

In the voltage saturation region where the inverter output voltage is saturated, it is necessary to perform magnetic flux weakening control in which a negative d-axis current flows, in order to reduce an apparent counter electromotive force of the electric motor 7. However, when the zero current control is performed in this voltage saturation region, the negative d-axis current can no longer flow, and the counter electromotive force of the electric motor 7 becomes larger than a maximum output voltage of the inverter 80 to cause step out. In addition, in a case where the zero current control for turning OFF the PWM signal is performed, regeneration occurs, and the bus voltage Vdc becomes excessively large.

Therefore, when operating the connection switching device 60 to switch the connection state, the second control device 100 performs the zero current control after stopping a boosting operation of the booster circuit 3. A more specific operation will be described with reference to FIG. 16.

First, the bus voltage Vdc is boosted by the booster circuit 3 before the connection state is switched. When the boosting of the bus voltage Vdc is completed, the frequency command value $\omega^*$ is increased. Then, immediately before switching the connection state, the boosting operation of the booster circuit 3 is stopped, and then the zero current control is performed. The connection state is switched during the zero current control, and the frequency command value $\omega^*$ is lowered when the switching is completed. Note that, after connection switching control is finished, the boosting operation by the booster circuit 3 may be performed as necessary. FIG. 16 illustrates an example in which the boosting operation is performed after the connection switching control is finished. Note that, FIG. 16 is an example, and control may be performed in a sequence other than FIG. 16. However, in a case of performing the zero current control at a higher speed, it is necessary to increase the bus voltage Vdc and drive the electric motor 7 in the non-voltage saturation region.

The control described above will be supplemented. In order to stop the boosting operation of the booster circuit 3, for example, it is sufficient if outputs of the first and second drive pulses Xa and Xb and the synchronous drive pulses Ya and Yb for controlling the operation of the booster circuit 3 are stopped. Note that this method is an example, and any control method may be used as long as the boosting operation of the booster circuit 3 can be stopped. In addition, the frequency command value $\omega^*$ is determined such that the electric motor 7 rotates at a rotation speed of a degree that does not cause step out. Further, an output voltage of the booster circuit 3, that is, the bus voltage Vdc is determined in accordance with the frequency command value $\omega^*$.

The above control enables non-stop connection switching control that is highly reliable.

Next, a description will be given of a set value of the bus voltage command value Vdc* at the time of performing the zero current control described above, by taking, as an example, a case where the electric motor 7 is a permanent magnet electric motor.

First, a voltage equation of a dq coordinate axis of the permanent magnet electric motor is expressed by the following Formulas (4) and (5).

$$V_d=(R_a+L_d p)i_d-\omega L_q i_q \quad (4)$$

$$V_q=(R_a+L_q p)i_q+\omega L_d i_d+\omega\varphi a \quad (5)$$

In the above Formulas (4) and (5), "$V_d$" and "$V_q$" represent dq-axis components of an armature voltage, "$i_d$" and "$i_q$" represent dq-axis components of an armature current, "$L_d$" and "$L_q$" represent an inductance of a dq axis, "$R_a$" represents an armature winding resistance, "$\varphi a$" represents an armature interlinkage magnetic flux of a permanent magnet in a dq coordinate system, and "p" represents a differential operator.

Further, in the above Formula (5), when $i_d=i_q=0$ is established by the above-described zero current control, the following Formula (6) is obtained.

$$V_q=\omega\varphi a \quad (6)$$

Therefore, in the case of performing the above-described zero current control, when the rotation speed of the electric motor 7 at the time of the connection switching is $\omega$, the bus voltage Vdc needs to satisfy the following Formula (7).

$$Vdc\geq\sqrt{2}\cdot\omega\cdot\varphi a \quad (7)$$

Further, a value of the armature interlinkage magnetic flux $\varphi a$ changes depending on the connection state. For this reason, it is necessary to satisfy the above Formula (7) both before and after the connection switching. Therefore, the armature interlinkage magnetic flux $\varphi a$ needs to be set to a constant having a larger value of the armature interlinkage magnetic flux $\varphi a$ before and after the connection switching.

For example, in a case of switching from the $\Delta$ connection to the Y connection, the armature interlinkage magnetic flux $\varphi a$ at the time of the Y connection is $\sqrt{3}$ times larger than that in the $\Delta$ connection, and thus a parameter of the Y connection is used for the armature interlinkage magnetic flux $\varphi a$. Further, for example, in a case of switching from the $\Delta$ connection to the Y connection, when the bus voltage Vdc according to the above Formula (7) is set with the parameter at the time of the $\Delta$ connection as the armature interlinkage magnetic flux $\varphi a$, a case is assumed in which the state enters the voltage saturation region at the time of the Y connection and the zero current control cannot be performed. In this case, since there is a possibility that an induced voltage of the electric motor 7 exceeds the bus voltage Vdc, the bus voltage Vdc is boosted so as to satisfy the above Formula (7).

With the above operation, it is possible to prevent a rapid increase in the bus voltage Vdc that may occur at the time of the connection switching. Further, during the connection switching, since the connection switching can be performed in a state where no current flows through the electric motor 7 and the switching units 61, 62, and 63, it is possible to prevent occurrence of arc discharge between the individual contacts of the switching units 61, 62, and 63. As a result, when a mechanical relay is used, contact welding can be prevented, and the electric motor drive device 200 with high reliability can be achieved. In addition, during the zero current control, since a current flowing through the switching units 61, 62, and 63 is set to zero, the connection switching can be performed without causing a large current change. This makes it possible to prevent a sudden change in rotation speed of the electric motor 7 due to the connection switching, and to perform the connection switching while reducing noise and vibration.

As described above, the electric motor drive device according to the first embodiment includes: the booster circuit; the inverter; the connection switching device that switches a connection state of windings of the electric motor; and the control device that controls operations of the booster circuit, the inverter, and the connection switching device. The control device performs zero current control to control the inverter such that a current flowing through the electric motor or the connection switching device is zero. Further, when operating the connection switching device to switch the connection state, the control device performs the zero current control after stopping a boosting operation of the booster circuit. By these controls, it is possible to prevent a rapid increase in bus voltage that may occur at a time of connection switching, while preventing occurrence of arc discharge between the individual contacts of the individual switching units. This can prevent damage to the switching element. In addition, since stress accumulation on the switching element can be prevented, it is possible to extend the life of the device and improve the reliability of the device. Further, to put it differently from another viewpoint, the connection switching device can be configured with a less expensive component in order to achieve desired durability, so that an increase in manufacturing cost of the device can be prevented.

In addition, in the electric motor drive device according to the first embodiment, in a case where the electric motor is a permanent magnet electric motor, the relationship of the above Formula (7) is desirably satisfied when the connection state of the windings is switched. When the relationship of the above Formula (7) is satisfied, a reduction range of the speed when the zero current control is performed can be reduced. As a result, even when the period of the zero current control becomes long, step out of the electric motor can be prevented.

Further, in the electric motor drive device according to the first embodiment, as pa used in the above Formula (7), it is desirable to use either the armature interlinkage magnetic flux φa before switching of the connection state or the armature interlinkage magnetic flux pa after of switching the connection state, whichever has a larger value. By using the armature interlinkage magnetic flux having a larger value, it is possible to prevent any one of the connection states before and after the connection state switching from entering the voltage saturation region. This allows the zero current control to be reliably performed.

Further, in the electric motor drive device according to the first embodiment, the control device desirably controls an output voltage of the booster circuit in accordance with a rotation speed of the electric motor at the time of switching the connection state. This allows the zero current control to be efficiently performed.

Second Embodiment

Figure 17:
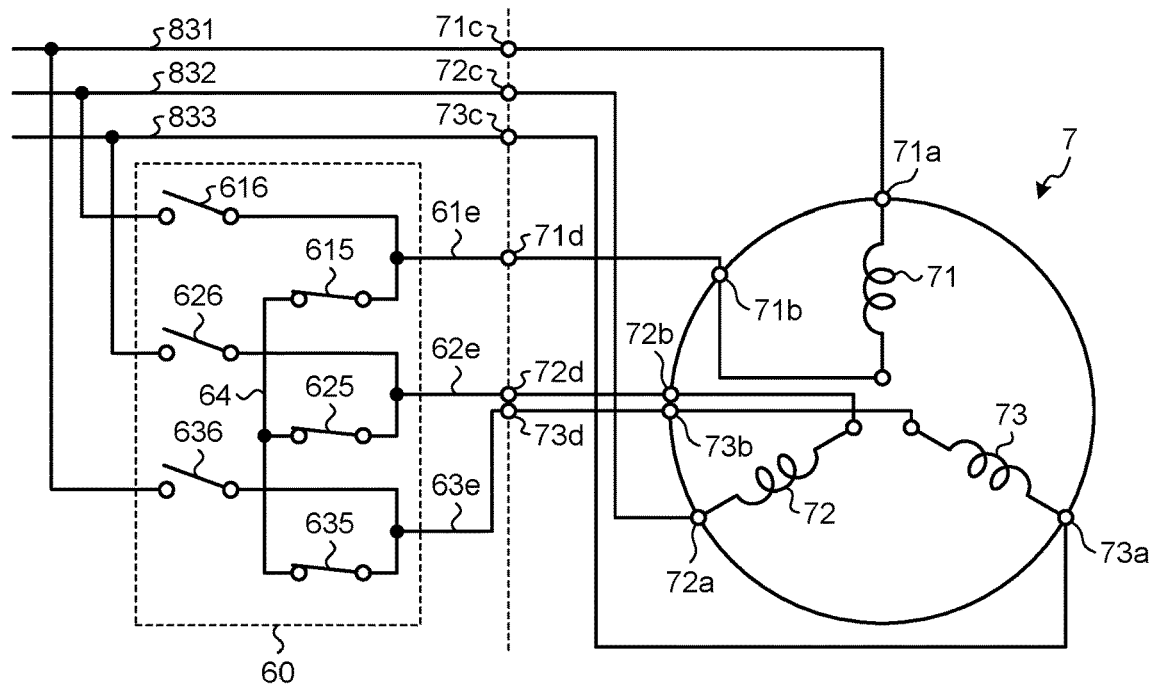
FIG. 17 is a wiring diagram illustrating in detail a connection mode between a connection switching device and an electric motor in a second embodiment.

FIG. 17 is a wiring diagram illustrating in detail a connection mode between the connection switching device 60 and the electric motor 7 in the second embodiment. In the configuration of FIG. 10, a changeover switch is used as each of the switching units 61, 62, and 63 of the connection switching device 60. Instead of that configuration, each switching unit may be configured by a combination of a normally closed switch and a normally open switch, and an exemplary configuration thereof is illustrated in FIG. 17.

In the configuration of FIG. 17, instead of the changeover switch of the switching unit 61, a combination of a normally closed switch 615 and a normally open switch 616 is used. Further, instead of the changeover switch of the switching unit 62, a combination of a normally closed switch 625 and a normally open switch 626 is used. Further, instead of the changeover switch of the switching unit 63, a combination of a normally closed switch 635 and a normally open switch 636 is used.

As in the illustration, in a state where the normally closed switches 615, 625, and 635 are closed and the normally open switches 616, 626, and 636 are opened, the electric motor 7 is in Y connection. Contrary to the illustration, in a state where the normally closed switches 615, 625, and 635 are opened and the normally open switches 616, 626, and 636 are closed, the electric motor 7 is in Δconnection.

As illustrated in FIG. 17, even in a case where each switching unit of the connection switching device 60 is configured by a combination of a normally closed switch and a normally open switch, an electromagnetic contactor can be used as each switch. The electromagnetic contactor is suitable because a conduction loss at the time of ON is small.

Further, as the normally closed switches 615, 625, and 635 and the normally open switches 616, 626, and 636 illustrated in FIG. 17, a switching element formed of a WBG semiconductor may be used. A semiconductor switch formed of a WBG semiconductor may be used. Since the semiconductor switch formed of a WBG semiconductor has a small ON-resistance, an effect of low loss and less element heat generation can be obtained. By using the semiconductor switch formed of a WBG semiconductor, the switching operation can be quickly performed.

As described above, the switching operation can be performed at a high speed even when the semiconductor switch is used, but operation variation of about several μs occurs between the individual semiconductor switches. Therefore, when a time constant L/R based on a winding resistance R and a winding inductance L of the electric motor 7 is very small, there is a possibility that a rapid current change occurs and the rotation speed of the electric motor 7 rapidly changes. As a result, there is a concern that vibration or noise is generated in the electric motor 7, and the semiconductor switch generates heat to cause thermal destruction.

On the other hand, by applying the zero current control described in the first embodiment to the connection switching device 60 configured by the semiconductor switch, and performing the connection switching during execution of the zero current control, it is possible to perform connection switching without causing a large current change. This makes it possible to prevent a sudden change in rotation speed of the electric motor 7 at the time of the connection switching, and thus it is possible to switch the connection state while reducing noise or vibration. In addition, since it is possible to prevent a rapid change in rotation speed of the electric motor 7 at the time of the connection switching, thermal destruction caused by heat generation of the semiconductor switch can be prevented.

Third Embodiment

In the first and second embodiments, the zero current control in the first embodiment is applied to the electric motor 7 in which the connection state of the windings can be switched mutually between the Y connection and the Δconnection, but the electric motor 7 may be an electric motor in which a connection state of windings is another different connection mode. For example, an electric motor used may include two or more winding portions as a winding of each phase and be switchable to either parallel connection or series connection. In this case, it suffices that both end portions of each of the two or more winding portions constituting the winding of each phase are drawn outside the electric motor, and connection of the drawn both end portions of each of the two or more winding portions is switched. Hereinafter, a specific exemplary configuration and an operation in the exemplary configuration will be described.

Figure 18:
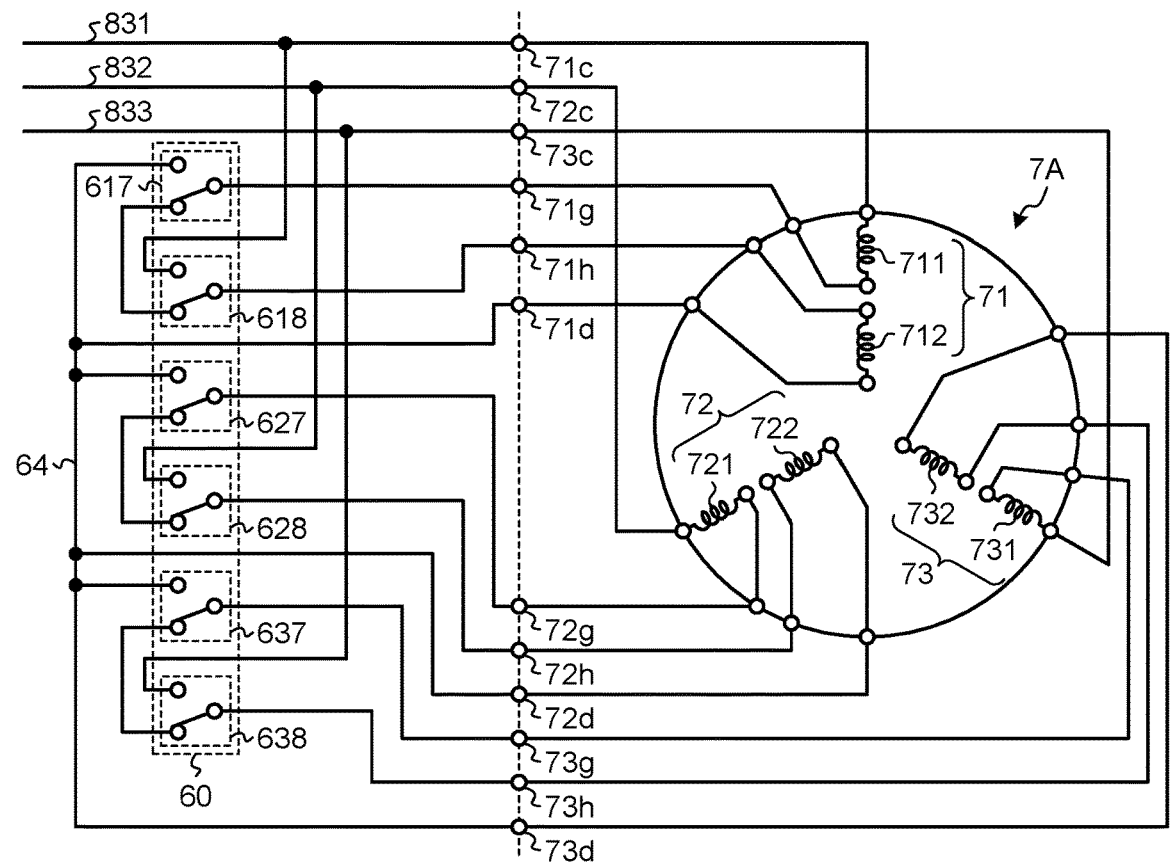
FIG. 18 is a wiring diagram illustrating in detail a connection mode between a connection switching device and an electric motor in a third embodiment.

FIG. 18 is a wiring diagram illustrating in detail a connection mode between the connection switching device 60 and an electric motor 7A in the third embodiment. FIG. 18 illustrates a configuration in which, in the electric motor 7A in Y connection, a winding of each phase is configured by two winding portions, both end portions of each of the winding portions are made connectable to the outside of the electric motor 7, and a connection state is switched by the connection switching device 60.

Specifically, the U-phase winding 71 includes two winding portions 711 and 712, the V-phase winding 72 includes two winding portions 721 and 722, and the W-phase winding 73 includes two winding portions 731 and 732.

First end portions of the winding portions 711, 721, and 73*l* are connected to the output lines 831, 832, and 833 of the inverter 80 via the external terminals 71*c*, 72*c*, and 73*c*. Second end portions of the winding portions 711, 721, and 73*l* are connected to common contacts of changeover switches 617, 627, and 637 via external terminals 71*g*, 72*g*, and 73*g*.

First end portions of the winding portions 712, 722, and 732 are connected to common contacts of changeover switches 618, 628, and 638 via external terminals 71*h*, 72*h*, and 73*h*. Second end portions of the winding portions 712, 722, and 732 are connected to the neutral point node 64 via the external terminals 71*d*, 72*d*, and 73*d*.

Normally closed contacts of the changeover switches 617, 627, and 637 are connected to normally closed contacts of the changeover switches 618, 628, and 638. Normally open contacts of the changeover switches 617, 627, and 637 are connected to the neutral point node 64. Normally open contacts of the changeover switches 618, 628, and 638 are connected to the output lines 831, 832, and 833 of the inverter 80. The changeover switches 617, 627, 637, 618, 628, and 638 constitute the connection switching device 60.

Even in a case where such a connection switching device 60 is used, the connection switching device 60 can be protected similarly to the first embodiment and the second embodiment.

In a case of the configuration illustrated in FIG. 18, in a state where the changeover switches 617, 627, 637, 618, 628, and 638 are switched to the normally closed contact side as in the illustration, the electric motor 7A is in the series connection state. On the other hand, in a state where the changeover switches 617, 627, 637, 618, 628, and 638 are switched to the normally open contact side contrary to the illustration, the electric motor 7A is in the parallel connection state.

Note that, also in the third embodiment, as described in the second embodiment, a combination of a normally closed switch and a normally open switch can be used instead of the changeover switch.

Although a case has been described above in which switching between the series connection state and the parallel connection state is performed in the electric motor 7A in the Y connection, the present disclosure is not limited to this example. The configuration according to the third embodiment is also applicable to switching between the series connection state and the parallel connection state, for example, in an electric motor in Δconnection.

In addition, the configuration has been described above in which the windings of individual phases of the Y connection or the Δ connection are switched to parallel connection or series connection, but the present disclosure is not limited to these examples. The configuration according to the third embodiment may be a configuration in which an intermediate tap is provided in the windings in the Y connection state or the Δ connection state, and a voltage necessary for driving is changed by short-circuiting some of the windings with a switching means. In short, the content of the present disclosure is applicable to any configuration as long as a connection state of windings of an electric motor can be switched, and a counter electromotive force can be switched by the switching of the connection state.

Note that the configuration described in the above embodiments is an example of the configuration of the present disclosure, and can be combined with another known technique, and it is obvious that a change such as partial omission can be made in the configuration without departing from the subject matter of the present disclosure.

REFERENCE SIGNS LIST

1 AC power supply; 2 reactor; 3 booster circuit; 3*a*, 3*b*, 3*c*, 3*d* connection point; 4 power-supply current detector; 5 smoothing capacitor; 6 first voltage detector; 7, 7A electric motor; 8 first control device; 10 second voltage detector; 12*a*, 12*b* DC bus; 20 power supply current command value control unit; 21 power supply current command value calculation unit; 22 on-duty control unit; 23 power supply voltage phase calculation unit; 24 on-duty calculation unit; 25 first drive pulse generation unit; 25*a* first triangular wave; 26 second drive pulse generation unit; 26*a* second triangular wave; 27 synchronous drive pulse generation unit; 27*a* third triangular wave; 27*b* fourth triangular wave; 31 first leg; 32 second leg; 40 bus current detection unit; 50 power supply circuit; 60 connection switching device; 61, 62, 63 switching unit; 61*e*, 62*e*, 63*e* lead wire; 61*a*, 62*a*, 63*a* normally open contact; 61*b*, 62*b*, 63*b* normally closed contact; 61*c*, 62*c*, 63*c* common contact; 64 neutral point node; 71, 72, 73 winding; 71*a*, 72*a*, 73*a* first end portion; 71*b*, 72*b*, 73*b* second end portion; 71*c*, 71*d*, 71*g*, 71*h*, 72*c*, 72*d*, 72*g*, 72*h*, 73c, 73d, 73g, 73h external terminal; 80 inverter; 100 second control device; 102 operation control unit; 110 inverter control unit; 111 current restoration unit; 112 three-phase/two-phase conversion unit; 113 excitation current command value generation unit; 115 voltage command value calculation unit; 116 electrical angle phase calculation unit; 117 two-phase/three-phase conversion unit; 118 PWM signal generation unit; 200 electric motor drive device; 311 first upper-arm switching element; 312 first lower-arm switching element; 321 second upper-arm switching element; 322 second lower-arm switching element; 604 semiconductor switch; 611, 621, 631 excitation coil; 615, 625, 635 normally closed switch; 616, 626, 636 normally open switch; 617, 618, 627, 628, 637, 638 changeover switch; 711, 712, 721, 722, 731, 732 winding portion; 810 inverter main circuit; 811 to 816 switching element; 821 to 826 rectifying element; 831, 832, 833 output line; 850 drive circuit; 900 refrigeration cycle application device; 901 compressor; 902 four-way valve; 904 compression mechanism; 906 indoor heat exchanger; 908 expansion valve; 910 outdoor heat exchanger; 912 refrigerant pipe; 1151, 1157, 1158 subtractor; 1152 frequency controller; 1153, 1155 switching unit; 1154, 1156 current controller; 1159 frequency estimation unit.

The invention claimed is:

1. An electric motor drive device comprising:
a booster circuit to boost a voltage value of a bus voltage to be applied to a direct-current bus;
an inverter to apply an alternating-current voltage having a variable frequency and a variable voltage value to an electric motor, the bus voltage being applied to the inverter;
a connection switching device to switch a connection state of a winding of the electric motor; and
a control device to control operations of the booster circuit, the inverter, and the connection switching device, and perform zero current control to control the inverter such that a current flowing through the electric motor or the connection switching device is zero, wherein
when operating the connection switching device to switch the connection state, the control device performs the zero current control after stopping a boosting operation of the booster circuit.

2. The electric motor drive device according to claim 1, wherein
the electric motor is a permanent magnet electric motor,
when the bus voltage at a time of switching the connection state is defined as Vdc,
a rotation speed of the electric motor at a time of switching the connection state is defined as ω, and
an armature interlinkage magnetic flux of the permanent magnet electric motor at a time of switching the connection state is defined as φa,
a relationship of $$Vdc \geq \sqrt{2} \cdot \omega \cdot \varphi a \quad (1)$$

is satisfied.

3. The electric motor drive device according to claim 2, wherein
as the φa used in Formula (1), either the armature interlinkage magnetic flux before switching of the connection state or the armature interlinkage magnetic flux after switching of the connection state, whichever has a larger value, is used.

4. The electric motor drive device according to claim 1, wherein
the control device controls an output voltage of the booster circuit in accordance with a rotation speed of the electric motor at a time of switching the connection state.

5. The electric motor drive device according to claim 1, wherein
the connection switching device includes a semiconductor switch that is controlled by a signal input to a control terminal.

6. The electric motor drive device according to claim 5, wherein
the semiconductor switch is formed of a wide band gap semiconductor.

7. A refrigeration cycle application device comprising the electric motor drive device according to claim 1.

* * * * *